United States Patent
Los et al.

(10) Patent No.: US 11,482,890 B2
(45) Date of Patent: Oct. 25, 2022

(54) SURFACE MOUNTABLE WIRELESS POWER TRANSMITTER FOR TRANSMISSION AT EXTENDED RANGE

(71) Applicant: NuCurrent, Inc., Chicago, IL (US)

(72) Inventors: Oleg Los, Buffalo Grove, IL (US); Md Nazmul Alam, Lombard, IL (US)

(73) Assignee: NuCurrent, Inc., Chicago, IL (US)

( * ) Notice: Subject to any disclaimer, the term of this patent is extended or adjusted under 35 U.S.C. 154(b) by 0 days.

(21) Appl. No.: 16/863,691

(22) Filed: Apr. 30, 2020

(65) Prior Publication Data
US 2021/0343470 A1 Nov. 4, 2021

(51) Int. Cl.
| | | |
|---|---|---|
| *H02J 50/70* | (2016.01) | |
| *H01F 27/29* | (2006.01) | |
| *H02J 50/40* | (2016.01) | |
| *H02J 50/12* | (2016.01) | |
| *H02J 50/80* | (2016.01) | |

(52) U.S. Cl.
CPC ............ *H02J 50/70* (2016.02); *H01F 27/292* (2013.01); *H02J 50/12* (2016.02); *H02J 50/40* (2016.02); *H02J 50/80* (2016.02)

(58) Field of Classification Search
CPC ........... H02J 50/00; H01F 27/292; H04B 5/00
See application file for complete search history.

(56) References Cited

U.S. PATENT DOCUMENTS

| | | | |
|---|---|---|---|
| 6,075,433 A | * | 6/2000 | Ono ........................ H02J 50/12 336/212 |
| 6,941,480 B1 | | 9/2005 | Dai |
| 7,960,944 B2 | | 6/2011 | Hoffman et al. |
| 9,130,386 B2 | | 9/2015 | Kawano et al. |

(Continued)

FOREIGN PATENT DOCUMENTS

| | | |
|---|---|---|
| CN | 111092493 A | 5/2020 |
| KR | 101213090 B1 | 12/2012 |

(Continued)

OTHER PUBLICATIONS

PCTUS2021030315 International Search Report and Written Opinion, dated Aug. 20, 2021, 11 pages.

(Continued)

*Primary Examiner* — Adi Amrany
(74) *Attorney, Agent, or Firm* — Lee Sullivan Shea & Smith LLP

(57) ABSTRACT

A surface mountable housing for a power transmitter for wireless power transfer includes a connector system configured for use to mount, at least, a transmitter antenna to an underside of a structural surface, such that the transmitter antenna is configured to couple with a receiver antenna of a power receiver when the receiver antenna is proximate to a top side of the structural surface. The surface mountable housing further includes a heat sink, the heat sink configured to rest, at least in part, below the transmitter antenna, when the power transmitter is connected to the structural surface, and configured to direct heat generated by the power transmitter away from the structural surface, and an antenna housing, the antenna housing substantially surrounding a side wall of the transmitter antenna, the antenna housing connected to the heat sink and positioned between the heat sink and the structural surface.

20 Claims, 18 Drawing Sheets

(56) References Cited

U.S. PATENT DOCUMENTS

| | | | |
|---|---|---|---|
| 9,912,187 B2* | 3/2018 | Sultenfuss | H02J 50/23 |
| 10,410,789 B2* | 9/2019 | Kurs | H02J 50/70 |
| 2004/0261422 A1 | 12/2004 | McEuen et al. | |
| 2005/0068019 A1 | 3/2005 | Nakamura et al. | |
| 2005/0288743 A1 | 12/2005 | Ahn et al. | |
| 2006/0209487 A1 | 9/2006 | Schmidt et al. | |
| 2011/0018498 A1* | 1/2011 | Soar | H02J 50/10 320/108 |
| 2011/0062793 A1* | 3/2011 | Azancot | H01F 38/14 307/116 |
| 2011/0090726 A1 | 4/2011 | Brotto et al. | |
| 2012/0217111 A1 | 8/2012 | Boys et al. | |
| 2013/0058380 A1 | 3/2013 | Kim et al. | |
| 2013/0069586 A1 | 3/2013 | Jung et al. | |
| 2013/0082536 A1 | 4/2013 | Taylor et al. | |
| 2013/0127580 A1* | 5/2013 | Dobbs | A61B 6/56 336/84 M |
| 2013/0162201 A1 | 6/2013 | Yeh | |
| 2013/0169062 A1 | 7/2013 | Maikawa et al. | |
| 2013/0307468 A1 | 11/2013 | Lee et al. | |
| 2014/0002015 A1 | 1/2014 | Tripathi et al. | |
| 2014/0239732 A1* | 8/2014 | Mach | H02J 50/10 307/104 |
| 2014/0354223 A1 | 12/2014 | Lee et al. | |
| 2015/0091389 A1* | 4/2015 | Byrne | H02J 50/90 307/104 |
| 2015/0214752 A1* | 7/2015 | Gluzman | H02J 50/40 307/104 |
| 2015/0222129 A1* | 8/2015 | McCauley | H02J 50/70 307/104 |
| 2015/0270776 A1 | 9/2015 | Mallik et al. | |
| 2015/0333532 A1 | 11/2015 | Han et al. | |
| 2016/0006289 A1 | 1/2016 | Sever et al. | |
| 2016/0094051 A1* | 3/2016 | Soar | H04B 5/0081 307/9.1 |
| 2016/0118179 A1 | 4/2016 | Park et al. | |
| 2016/0181821 A1* | 6/2016 | Xu | H01F 27/36 307/104 |
| 2017/0090531 A1 | 3/2017 | Forbes et al. | |
| 2017/0129344 A1* | 5/2017 | Islinger | H01F 38/14 |
| 2017/0133887 A1 | 5/2017 | Tominaga et al. | |
| 2017/0194092 A1* | 7/2017 | Vix | H01F 27/24 |
| 2017/0245679 A1* | 8/2017 | Watts | H05B 6/1236 |
| 2017/0287626 A1 | 10/2017 | Larson et al. | |
| 2017/0288465 A1 | 10/2017 | Sugasawa et al. | |
| 2017/0331335 A1 | 11/2017 | Brooks et al. | |
| 2017/0358950 A1 | 12/2017 | Zeine et al. | |
| 2017/0368945 A1 | 12/2017 | Park et al. | |
| 2018/0204674 A1 | 7/2018 | Cho et al. | |
| 2018/0277926 A1* | 9/2018 | Park | H01F 27/306 |
| 2019/0267845 A1 | 8/2019 | Maniktala | |
| 2019/0384603 A1 | 12/2019 | Kim et al. | |
| 2019/0394906 A1 | 12/2019 | Smith et al. | |
| 2020/0094700 A1 | 3/2020 | Hui | |
| 2020/0177028 A1 | 6/2020 | Esteban et al. | |
| 2020/0235612 A1 | 7/2020 | Muratov | |
| 2020/0373072 A1 | 11/2020 | Leem | |
| 2021/0075255 A1 | 3/2021 | Nutting et al. | |
| 2021/0159736 A1 | 5/2021 | Miyamoto et al. | |
| 2021/0296999 A1 | 9/2021 | Taleb et al. | |
| 2021/0354577 A1 | 11/2021 | Books et al. | |

FOREIGN PATENT DOCUMENTS

| | | |
|---|---|---|
| KR | 20190087733 A | 7/2019 |
| KR | 20200113098 A | 10/2020 |
| WO | 2014092339 A1 | 6/2014 |
| WO | 2015064815 A1 | 5/2015 |
| WO | 2019148070 A2 | 8/2019 |

OTHER PUBLICATIONS

International Searching Authority, PCT International Search Report and Written Opinion, PCT International Application No. PCT/US2021/064964 dated Apr. 28, 2022, 14 pages.

Brownout Definition & Meeting, Merriam-Webster [online], [retrieved Jul. 16, 2022], Retrieved from the internet: http://www.merriam-webster.com/dictionary/brownout, 3 Pages.

International Searching Authority, PCT International Search Report and Written Opinion, PCT International Application No. PCT/US2022/014409 dated May 16, 2022, 8 pages.

* cited by examiner

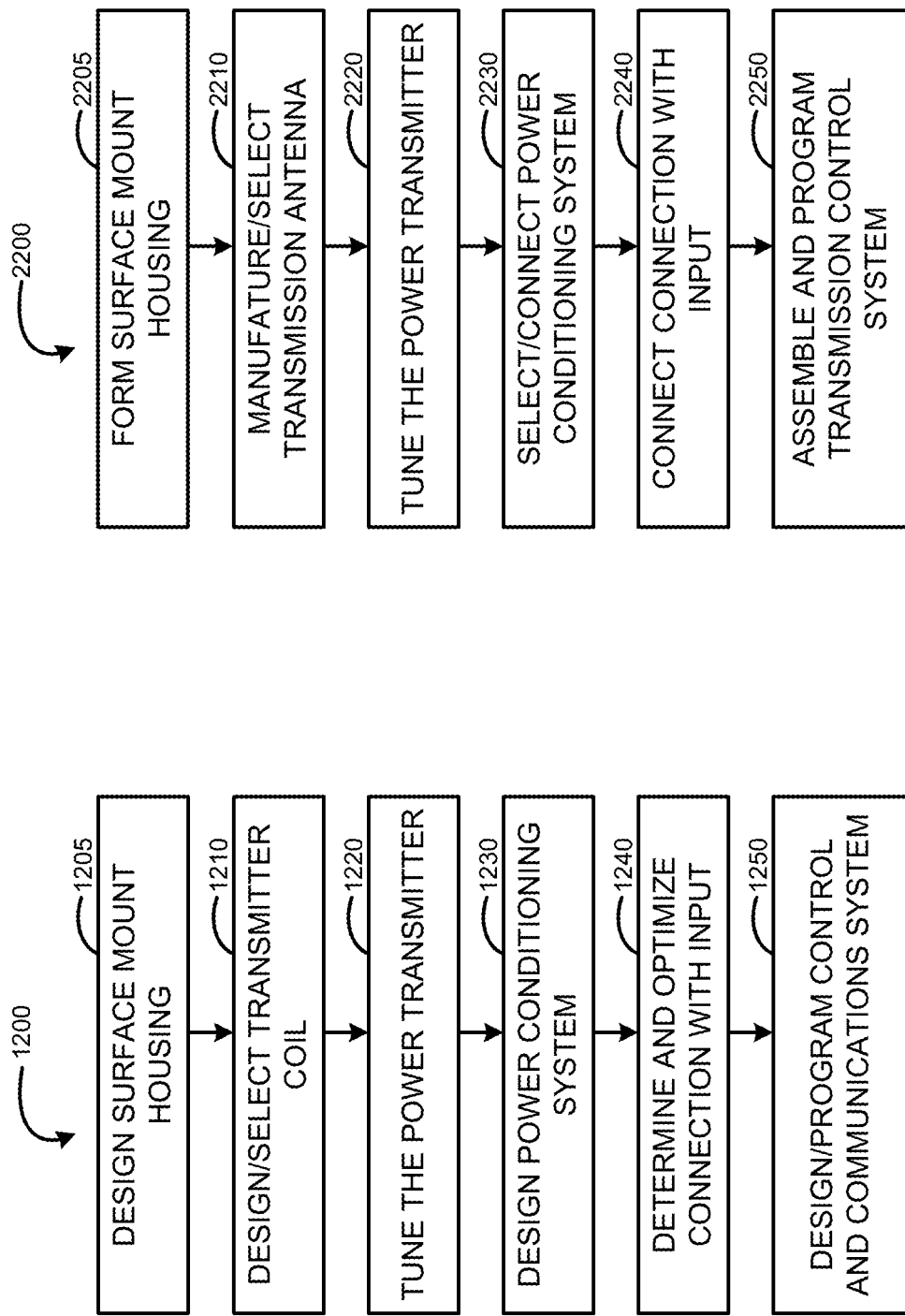

SURFACE MOUNTABLE WIRELESS POWER TRANSMITTER FOR TRANSMISSION AT EXTENDED RANGE

TECHNICAL FIELD

The present disclosure generally relates to systems and methods for wireless transfer of electrical power and, more particularly, to surface mountable wireless power transmitters for transmitting power at extended separation distances.

BACKGROUND

Wireless power transfer systems are used in a variety of applications for the wireless transfer of electrical energy, electrical power signals, electromagnetic energy, electrical data signals, among other known wirelessly transmittable signals. Such systems often use inductive wireless power transfer, which occurs when magnetic fields created by a transmitting element induce an electric field, and hence, an electric current, in a receiving element. These transmission and receiver elements will often take the form of coiled wires and/or antennas.

Because some wireless power transfer systems are operable and/or most efficient in the near-field, some transmitters may be limited to having operability only at restrictively small gaps between the transmitter coil and the receiver coil. To that end, typical wireless power transmitters under the Wireless Power Consortium's Qi™ standard may be limited to operability at a maximum coil-to-coil separation gap (which may be referred to herein as a "separation gap" or "gap") of about 3 millimeters (mm) to about 5 mm. The separation gap is sometimes known as the Z-height or Z-distance and is generally measured as the distance between the transmitter coil and receiver coil.

As the adoption of wireless power grows, commercial applications are requiring a power transmitter capable of transferring power to a power receiver with a gap greater than 3-5 mm. By way of example, cabinets and/or counter tops may be more than 3-5 mm thick and as a result, prevent wireless charging through such furniture. Accordingly, if a wireless power transmitter is only capable of transmitting through 3-5 mm of materials, such a charger may need to, expensively, be built into such infrastructure, like cabinets, countertops, and/or tables. Such need for built in chargers limits modularity, in terms of placement of the power transmitter relative to the infrastructure.

SUMMARY

Accordingly, new wireless power transmitters that are capable of attachment underneath a surface and can properly couple with a power receiver atop said surface are desired. To that end, wireless power transmitters and/or associated base stations are desired that are capable of delivering wireless power signals to a power receiver at a separation gap larger than the about 3 mm to about 5 mm separation gaps of legacy transmitters, so that such wireless power transmitters can be attached to the bottom of a surface and transmit to a receiver atop said surface.

In an embodiment, the overall structure of the transmitter is configured in a way that allows the transmitter to transfer power at an operating frequency of about 87 kilohertz (kHz) to about 205 kHz and achieve the same and/or enhanced relative characteristics (e.g., rate of power transfer, speed of power transfer, power level, power level management, among other things) of power transfer as legacy transmitters that operated in that frequency range. As a result, the separation gap may be increased from about 3-5 mm to around 15 mm or greater using the overall structure of the transmitter. In an embodiment, a transmitter may be configured with a ferrite core that substantially surrounds the transmitter antenna on three sides. The only place that the ferrite core does not surround the transmitter antenna is on the top (e.g., in the direction of power transfer) and where the power lines connect to the transmitter antenna. This overall structure of the transmitter allows for the combination of power transfer characteristics, power level characteristics, self-resonant frequency restraints, design requirements, adherence to standards bodies' required characteristics, bill of materials (BOM) and/or form factor constraints, among other things, that allow for power transfer over larger separation gaps.

Further, as increasing the separation gap may be associated with a rise in power levels, proper thermal mitigation should be utilized in new, higher separation gap wireless power transmitters. The systems and apparatus described herein allow for such thermal mitigation, so that the large separation gap is achieved without doing damage to one or more of the power transmitter, the device to be powered and/or power receiver associated with said device, the surface to which the power transmitter is mounted, or combinations thereof.

Additionally, the utilization of the power transmitters and/or transmitter antennas, disclosed herein, as part of a surface mountable power transmitter allow for greater modularity in transmitter placement, relative to the surface upon which the power transmitter is mounted. Further, in some examples, the extended separation distance achieved by the power transmitters, disclosed herein, may allow for usage of surface mountable power transmitters on thicker surface thicknesses and/or thicker materials for the surfaces, when compared with legacy surface-associated power transmitters.

Transmission of one or more of electrical energy, electrical power, electromagnetic energy or electronic data signals from one of such coiled antennas to another, generally, operates at an operating frequency and/or an operating frequency range. The operating frequency may be selected for a variety of reasons, such as, but not limited to, power transfer characteristics, power level characteristics, self-resonant frequency restraints, design requirements, adherence to standards bodies' required characteristics, bill of materials (BOM) and/or form factor constraints, among other things. It is to be noted that, "self-resonating frequency," as known to those having skill in the art, generally refers to the resonant frequency of an inductor due to the parasitic characteristics of the component.

In accordance with one aspect of the disclosure, a power transmitter for wireless power transfer at an operating frequency selected from a range of about 87 kilohertz (kHz) to about 205 kHz is disclosed. The power transmitter includes a control and communications unit, an inverter circuit configured to receive input power and convert the input power to a power signal, and a transmitter antenna. The transmitter antenna includes a coil configured to transmit the power signal to a power receiver, the coil formed of wound Litz wire and including at least one layer, the coil defining, at least, a top face, and a shielding comprising a ferrite core and defining a cavity, the cavity configured such that the ferrite core substantially surrounds all but the top face of the coil. The power transmitter further includes a surface mountable housing, the surface mountable housing substantially connected to, at least, the transmitter antenna and the surface mountable housing including a connector system configured for use to mount, at least, the transmitter antenna to an underside of a structural surface such that the transmitter antenna is configured to couple with a receiver antenna of the power receiver when the receiver antenna is proximate to a top side of the structural surface.

In a refinement, at least part of the surface mountable housing further includes a heat sink, the heat sink configured to rest, at least in part, below the transmitter antenna, when the power transmitter is connected to the structural surface, and configured to direct heat generated by the power transmitter away from the structural surface In a further refinement, the power transmitter further includes a transmitter electronics circuit board, the transmitter electronics circuit board including components of one or more of the control and communications circuit, the inverter circuit, or combinations thereof, and the heat sink is configured to dissipate heat, generated by one or more of the electronics circuit board or components located on the electronics circuit board, away from the structural surface.

In yet a further refinement, the power transmitter further includes a thermal interface material, the thermal interface material disposed between the electronics circuit board and the heat sink and configured to direct heat from the electronics circuit board to the heat sink.

In yet a further refinement, the thermal interface material includes one or more of a thermal paste, a thermal adhesive, a thermal gap filter, a thermally conductive pad, a thermal tape, a phase-change material, a metal thermal interface, or combinations thereof.

In another further refinement, the surface mountable housing further includes an antenna housing, the antenna housing substantially surrounding a side wall of the transmitter antenna and the antenna housing is connected to the heat sink and positioned between the heat sink and the structural surface.

In another further refinement, the heat sink defines one or more cut outs, each of the one or more cut outs configured to increase external surface area of the heat sink.

In another further refinement, the heat sink is formed, at least in part, from aluminum.

In a refinement, thickness between the underside of the structural surface and the top side of the structural surface is in a range of about 5 millimeters (mm) to about 15 mm, and the surface mountable housing is configured to mount directly to the underside of the structural surface via the connection system.

In a refinement, a surface thickness is defined as a thickness between the underside of the structural surface and the top side of the structural surface, the structural member defines a hole, the hole defining a hole ceiling and a hole opening, a hole thickness is defined as a thickness between the hole ceiling and the hole opening, the hole thickness is less than the surface thickness, and the surface mountable housing is configured to mount to the hole ceiling of the hole of the structural surface.

In a further refinement, the surface thickness is in a range of about 20 mm to about 60 mm and the hole thickness is in a range of about 5 mm to about 50 mm.

In accordance with another aspect of the disclosure, a surface mountable power transmitter for wireless power transfer at an operating frequency selected from a range of about 87 kilohertz (kHz) to about 205 kHz, the surface mountable power transmitter configured to be mounted on an underside of a structural surface, is disclosed. The surface mountable power transmitter includes a control and communications unit, an inverter circuit configured to receive input power and convert the input power to a power signal, and a transmitter antenna. The transmitter antenna includes a coil configured to transmit the power signal to a power receiver, the coil formed of wound Litz wire and including at least one layer, the coil defining, at least, a top face, and a shielding comprising a ferrite core and defining a cavity, the cavity configured such that the ferrite core substantially surrounds all but the top face of the coil. The power transmitter further includes a surface mountable housing, the surface mountable housing substantially connected to, at least, the transmitter antenna and the surface mountable housing including a connector system configured for use to mount, at least, the transmitter antenna to an underside of a structural surface such that the transmitter antenna is configured to couple with a receiver antenna of the power receiver when the receiver antenna is proximate to a top side of the structural surface.

In a refinement, the shielding is an E-Core type shielding and the cavity is configured in an E-shape configuration.

In a refinement, the at least one layer comprises a first layer and a second layer.

In a further refinement, the Litz wire is a bifilar Litz wire.

In yet a further refinement, the first layer includes a first number of turns in a range of about 4 turns to about 5 turns, and wherein the second layer includes a second number of turns in a range of about 4 turns to about 5 turns.

In a refinement, a shielding outer edge of the shielding extends about 4.5 millimeters (mm) to about 6.5 mm outward from a coil outer edge of the coil.

In a refinement, the coil has an outer diameter length in a range of about 40 mm to about 50 mm.

In a refinement, the coil has an inner diameter length in a range of about 15 mm to about 25 mm.

In accordance with yet another aspect of the disclosure, a surface mountable housing for a power transmitter for wireless power transfer at an operating frequency selected from a range of a about 87 kilohertz (kHz) to about 205 kHz, the power transmitter including, at least, a transmitter antenna, is disclosed. The surface mountable housing includes a connector system configured for use to mount, at least, the transmitter antenna to an underside of a structural surface, such that the transmitter antenna is configured to couple with a receiver antenna of a power receiver when the receiver antenna is proximate to a top side of the structural surface. The surface mountable housing further includes a heat sink, the heat sink configured to rest, at least in part, below the transmitter antenna, when the power transmitter is connected to the structural surface, and configured to direct heat generated by the power transmitter away from the structural surface, and an antenna housing, the antenna housing substantially surrounding a side wall of the transmitter antenna, the antenna housing connected to the heat sink and positioned between the heat sink and the structural surface.

These and other aspects and features of the present disclosure will be better understood when read in conjunction with the accompanying drawings.

BRIEF DESCRIPTION OF THE DRAWINGS

FIG. 16 is a flow chart for an exemplary method for designing a power transmitter, in accordance with FIGS. 1-15 and the present disclosure.

FIG. 17 is a flow chart for an exemplary method for manufacturing a power transmitter, in accordance with FIGS. 1-16 and the present disclosure.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto. Additional, different, or fewer components and methods may be included in the systems and methods.

DETAILED DESCRIPTION

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
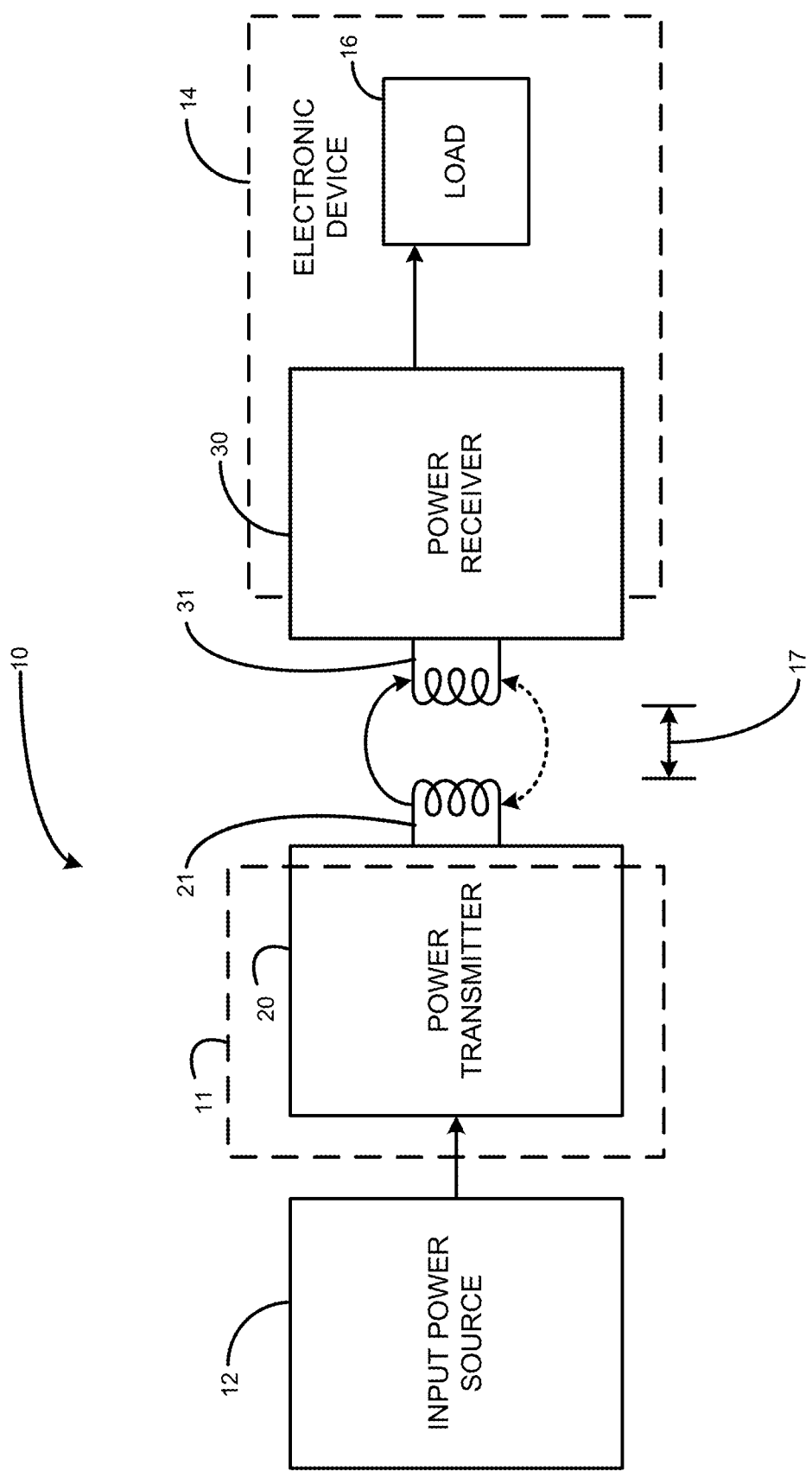
FIG. 1 is an exemplary block diagram of an embodiment of a wireless power transfer system, in accordance with an embodiment of the present disclosure.

Referring now to the drawings and with specific reference to FIG. 1, a wireless power transfer system 10 is illustrated. The wireless power transfer system 10 provides for the wireless transmission of electrical signals, such as, but not limited to, electrical energy, electrical power signals, and electromagnetic energy. Additionally, the wireless power transfer system 10 may provide for wireless transmission of electronically transmittable data ("electronic data") independent of and/or associated with the aforementioned electrical signals. Specifically, the wireless power transfer system 10 provides for the wireless transmission of electrical signals via near field magnetic coupling. As shown in the embodiment of FIG. 1, the wireless power transfer system 10 includes a power transmitter 20 and a power receiver 30. The power receiver 30 is configured to receive electrical energy, electrical power, electromagnetic energy, and/or electronic data from, at least, the power transmitter 20.

As illustrated, the power transmitter 20 and power receiver 30 may be configured to transmit electrical energy, via transmitter antenna 21 and receiver antenna 31, electrical power, electromagnetic energy, and/or electronically transmittable data across, at least, a separation distance or gap 17. A separation distance or gap, such as the gap 17, in the context of a wireless power transfer system, such as the system 10, does not include a physical connection, such as a wired connection. There may be intermediary objects located in a separation distance or gap, such as the gap 17, such as, but not limited to, air, a counter top, a casing for an electronic device, a grip device for a mobile device, a plastic filament, an insulator, a mechanical wall, among other things; however, there is no physical, electrical connection at such a separation distance or gap.

The combination of the power transmitter 20 and the power receiver 30 create an electrical connection without the need for a physical connection. "Electrical connection," as defined herein, refers to any facilitation of a transfer of an electrical current, voltage, and/or power from a first location, device, component, and/or source to a second location, device, component, and/or destination. An "electrical connection" may be a physical connection, such as, but not limited to, a wire, a trace, a via, among other physical electrical connections, connecting a first location, device, component, and/or source to a second location, device, component, and/or destination. Additionally or alternatively, an "electrical connection" may be a wireless electrical connection, such as, but not limited to, magnetic, electromagnetic, resonant, and/or inductive field, among other wireless electrical connections, connecting a first location, device, component, and/or source to a second location, device, component, and/or destination.

Alternatively, the gap 17 may be referenced as a "Z-Distance," because, if one considers an antenna 21, 31 to be disposed substantially along a common X-Y plane, then the distance separating the antennas 21, 31 is the gap in a "Z" or "depth" direction. However, flexible and/or non-planar coils are certainly contemplated by embodiments of the present disclosure and, thus, it is contemplated that the gap 17 may not be uniform, across an envelope of connection distances between the antennas 21, 31. It is contemplated that various tunings, configurations, and/or other parameters may alter the possible maximum distance of the gap 17, such that electrical transmission from the power transmitter 20 to the power receiver 30 remains possible.

The wireless power transfer system 10 operates when the power transmitter 20 and the power receiver 30 are coupled. As defined herein, the terms "couples," "coupled," and "coupling" generally refers to magnetic field coupling, which occurs when the energy of a transmitter and/or any components thereof and the energy of a receiver and/or any components thereof are coupled to each other through a magnetic field. Coupling of the power transmitter 20 and the power receiver 30, in the system 10, may be represented by a resonant coupling coefficient of the system 10 and, for the purposes of wireless power transfer, the coupling coefficient for the system 10 may be in the range of about 0.01 and 0.9.

The power transmitter 20 may be operatively associated with a base station 11. The base station 11 may be a device, such as a charger, that is able to provide near-field inductive power, via the power transmitter 20, to a power receiver. In some examples, the base station 11 may be configured to provide such near-field inductive power as specified in the Qi™ Wireless Power Transfer System, Power Class 0 Specification. In some such examples, the base station 11 may carry a logo to visually indicate to a user that the base station 11 complies with the Qi™ Wireless Power Transfer System, Power Class 0 Specification.

The power transmitter 20 may receive power from an input power source 12. The base station 11 may be any electrically operated device, circuit board, electronic assembly, dedicated charging device, or any other contemplated electronic device. Example base stations 11, with which the power transmitter 20 may be associated therewith, include, but are not limited to including, a device that includes an integrated circuit, cases for wearable electronic devices, receptacles for electronic devices, a portable computing device, clothing configured with electronics, storage medium for electronic devices, charging apparatus for one or multiple electronic devices, dedicated electrical charging devices, activity or sport related equipment, goods, and/or data collection devices, among other contemplated electronic devices.

The input power source 12 may be or may include one or more electrical storage devices, such as an electrochemical cell, a battery pack, and/or a capacitor, among other storage devices. Additionally or alternatively, the input power source 12 may be any electrical input source (e.g., any alternating current (AC) or direct current (DC) delivery port) and may include connection apparatus from said electrical input source to the wireless transmission system 20 (e.g., transformers, regulators, conductive conduits, traces, wires, or equipment, goods, computer, camera, mobile phone, and/or other electrical device connection ports and/or adaptors, such as but not limited to USB or lighting ports and/or adaptors, among other contemplated electrical components).

Electrical energy received by the power transmitter 20 is then used for at least two purposes: providing electrical power to internal components of the power transmitter 20 and providing electrical power to the transmitter coil 21. The transmitter coil 21 is configured to wirelessly transmit the electrical signals conditioned and modified for wireless transmission by the power transmitter 20 via near-field magnetic coupling (NFMC). Near-field magnetic coupling enables the transfer of electrical energy, electrical power, electromagnetic energy, and/or electronically transmissible data wirelessly through magnetic induction between the transmitter coil 21 and a receiving coil 31 of, or associated with, the power receiver 30. Near-field magnetic coupling may enable "inductive coupling," which, as defined herein, is a wireless power transmission technique that utilizes an alternating electromagnetic field to transfer electrical energy between two or more antennas/coils. Such inductive coupling is the near field wireless transmission of electrical energy between two magnetically coupled coils that are tuned to resonate at a similar frequency. Further, such near-field magnetic coupling may provide connection via "mutual inductance," which, as defined herein is the production of an electromotive force in a circuit by a change in current in at least one circuit magnetically coupled to the first.

In one or more embodiments, the inductor coils of either the transmitter coil 21 or the receiver coil 31 are strategically positioned to facilitate reception and/or transmission of wirelessly transferred electrical energy, power, electromagnetic energy and/or data through near field magnetic induction. Antenna operating frequencies may comprise all operating frequency ranges, examples of which may include, but are not limited to, about 87 kHz to about 205 kHz (Qi™ interface standard). The operating frequencies of the coils 21, 31 may be operating frequencies designated by the International Telecommunications Union (ITU) in the Industrial, Scientific, and Medical (ISM) frequency bands.

As known to those skilled in the art, a "resonant frequency" or "resonant frequency band" refers to a frequency or frequencies wherein amplitude response of the antenna is at a relative maximum, or, additionally or alternatively, the frequency or frequency band where the capacitive reactance has a magnitude substantially similar to the magnitude of the inductive reactance. In one or more embodiments the transmitting antenna resonant frequency band extends from about 87 kHz to about 205 kHz. In one or more embodiments the inductor coil of the receiver coil 31 is configured to resonate at a receiving antenna resonant frequency or within a receiving antenna resonant frequency band.

In some examples, the transmitting coil and the receiving coil of the present disclosure may be configured to transmit and/or receive electrical power at a baseline power profile having a magnitude up to about 5 watts (W). In some other examples, the transmitting coil and the receiving coil of the present disclosure may be configured to transmit and/or receive electrical power at an extended power profile, supporting transfer of up to 15 W of power.

The power receiver 30 is configured to acquire near-field inductive power from the power transmitter 20. In some examples, the power receiver 30 is a subsystem of an electronic device 14. The electronic device 14 may be any device that is able to consume near field inductive power as specified in the Qi™ Wireless Power Transfer System, Power Class 0 Specification. In some such examples, the electronic device 14 may carry a logo to visually indicate to a user that the electronic device 14 complies with the Specification.

The electronic device 14 may be any device that requires electrical power for any function and/or for power storage (e.g., via a battery and/or capacitor). Additionally or alternatively, the electronic device 14 may be any device capable of receipt of electronically transmissible data. For example, the device may be, but is not limited to being, a handheld computing device, a mobile device, a portable appliance, an integrated circuit, an identifiable tag, a kitchen utility device, an automotive device, an electronic tool, an electric vehicle, a game console, a robotic device, a wearable electronic device (e.g., an electronic watch, electronically modified glasses, altered-reality (AR) glasses, virtual reality (VR) glasses, among other things), a portable scanning device, a portable identifying device, a sporting good, an embedded sensor, an Internet of Things (IoT) sensor, IoT enabled clothing, IoT enabled recreational equipment, industrial equipment, medical equipment, a medical device, a tablet computing device, a portable control device, a remote controller for an electronic device, a gaming controller, among other things.

For the purposes of illustrating the features and characteristics of the disclosed embodiments, arrow-ended lines are utilized to illustrate transferrable and/or communicative signals and various patterns are used to illustrate electrical signals that are intended for power transmission and electrical signals that are intended for the transmission of data and/or control instructions. Solid lines indicate signal transmission of electrical energy, electrical power signals, and/or electromagnetic energy over a physical and/or wireless electrical connection, in the form of power signals that are, ultimately, utilized in wireless power transmission from the power transmitter 20 to the power receiver 30. Further, dotted lines are utilized to illustrate electronically transmittable data signals, which ultimately may be wirelessly transmitted from the power transmitter 20 to the power receiver 30.

Figure 2:
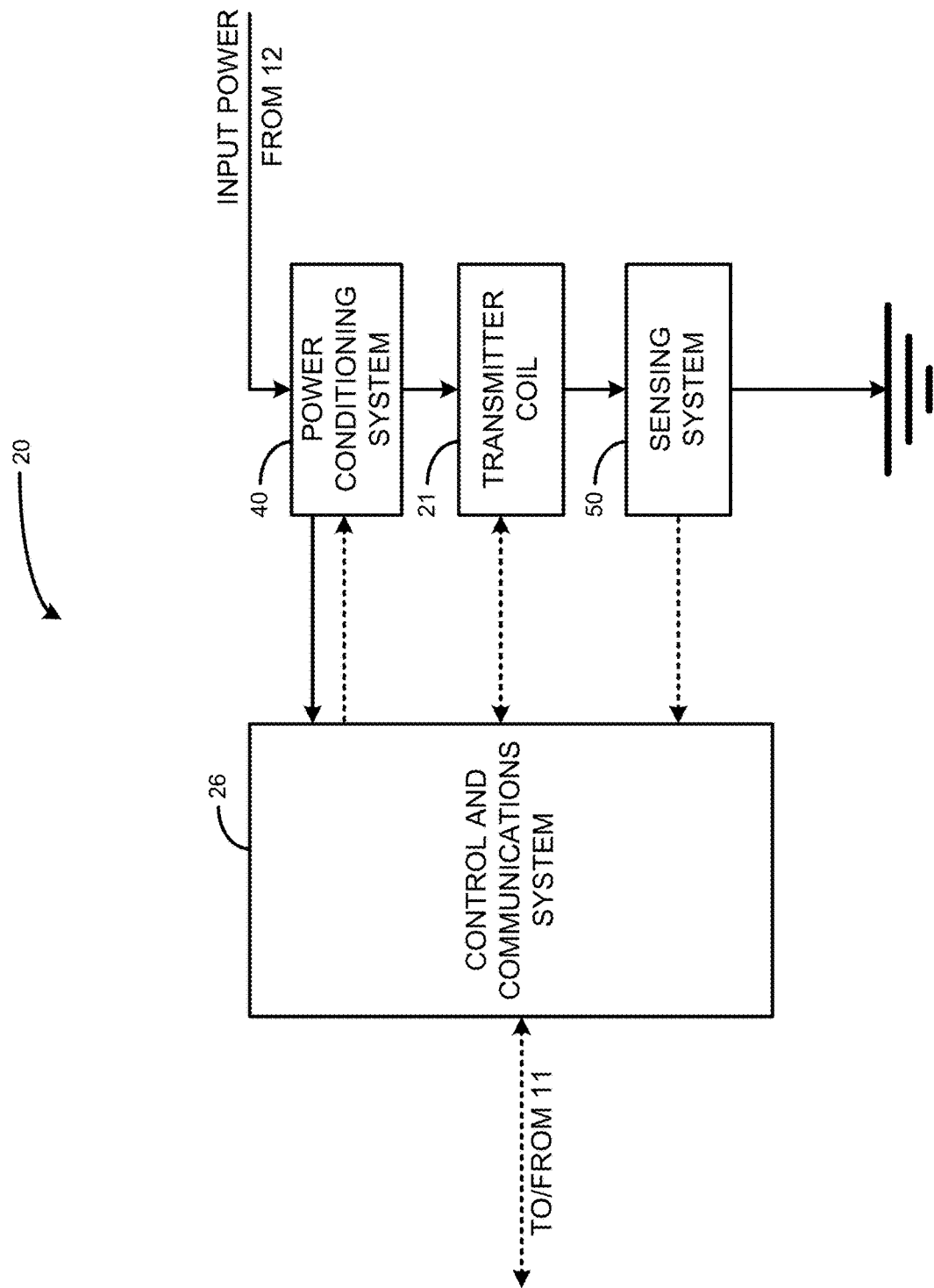
FIG. 2 is an exemplary block diagram for a power transmitter, which may be used in conjunction with the wireless power transfer system of FIG. 1, in accordance with FIG. 1 and an embodiment of the present disclosure.

Turning now to FIG. 2, the wireless power transfer system 10 is illustrated as a block diagram including example sub-systems of the power transmitter 20. The wireless transmission system 20 may include, at least, a power conditioning system 40, a control and communications system 26, a sensing system 50, and the transmission coil 21. A first portion of the electrical energy input from the input power source 12 is configured to electrically power components of the wireless transmission system 20 such as, but not limited to, the control and communications system 26. A second portion of the electrical energy input from the input power source 12 is conditioned and/or modified for wireless power transmission, to the power receiver 30, via the transmission coil 21. Accordingly, the second portion of the input energy is modified and/or conditioned by the power conditioning system 40. While not illustrated, it is certainly contemplated that one or both of the first and second portions of the input electrical energy may be modified, conditioned, altered, and/or otherwise changed prior to receipt by the power conditioning system 40 and/or transmission control system 26, by further contemplated subsystems (e.g., a voltage regulator, a current regulator, switching systems, fault systems, safety regulators, among other things).

The control and communications system 26, generally, comprises digital logic portions of the power transmitter 20. The control and communications system 26 receives and decodes messages from the power receiver 30, executes the relevant power control algorithms and protocols, and drives the frequency of the AC waveform to control the power transfer. As discussed in greater detail below, the control and communications system 26 also interfaces with other subsystems of the power transmitter 20. For example, the control and communications system 26 may interface with other elements of the power transmitter 20 for user interface purposes.

Figure 3:
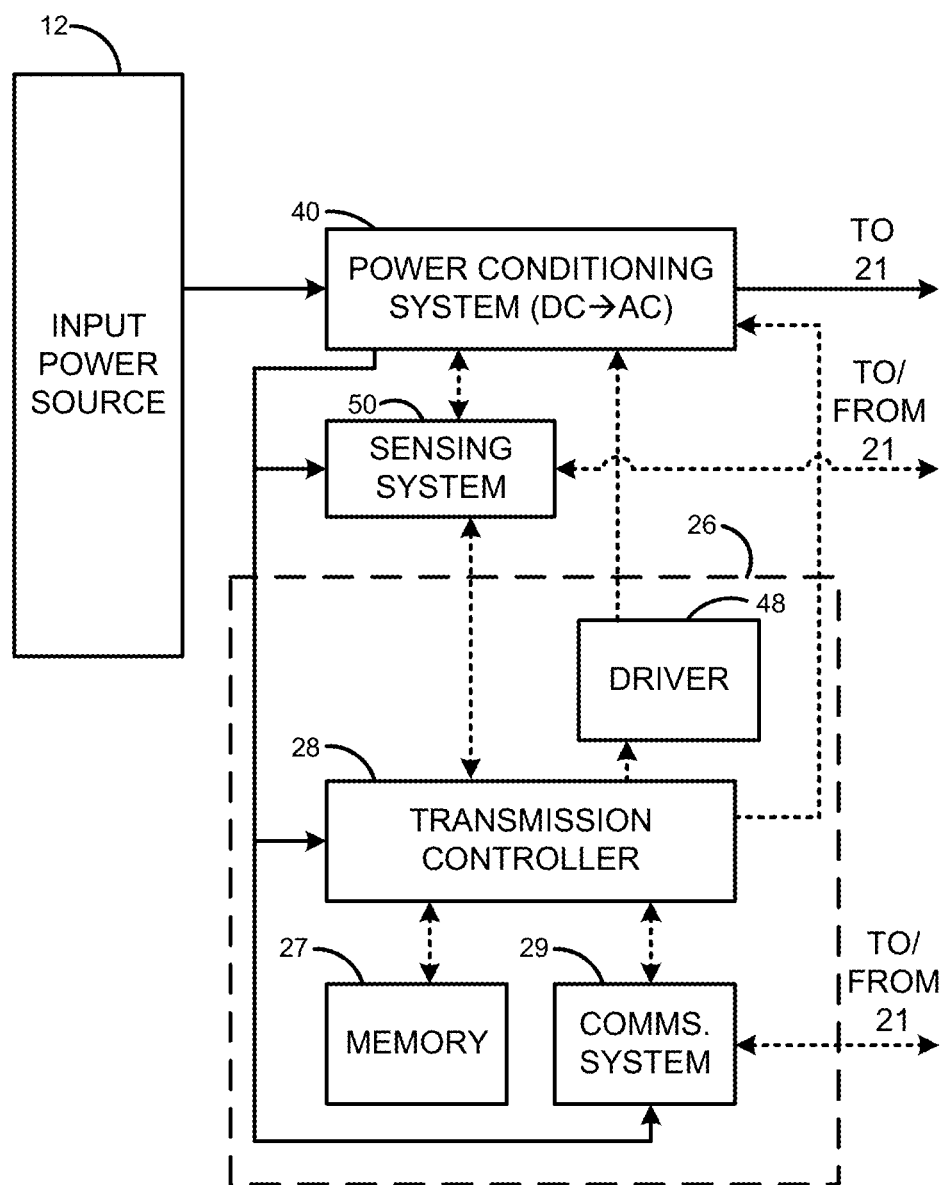
FIG. 3 is an exemplary block diagram for components of a control and communications system of the power transmitter of FIG. 2, in accordance with FIGS. 1-2 and an embodiment of the present disclosure.

Referring now to FIG. 3, with continued reference to FIGS. 1 and 2, subcomponents and/or systems of the control and communications system 26 are illustrated. The control and communications system 26 may include a transmission controller 28, a communications system 29, a driver 48, and a memory 27.

The transmission controller 28 may be any electronic controller or computing system that includes, at least, a processor which performs operations, executes control algorithms, stores data, retrieves data, gathers data, controls and/or provides communication with other components and/or subsystems associated with the power transmitter 20, and/or performs any other computing or controlling task desired. The transmission controller 28 may be a single controller or may include more than one controller disposed to control various functions and/or features of the power transmitter 20. Functionality of the transmission controller 28 may be implemented in hardware and/or software and may rely on one or more data maps relating to the operation of the power transmitter 20. To that end, the transmission controller 28 may be operatively associated with the memory 27. The memory may include one or more of internal memory, external memory, and/or remote memory (e.g., a database and/or server operatively connected to the transmission controller 28 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media.

While particular elements of the control and communications system 26 are illustrated as independent components and/or circuits (e.g., the driver 48, the memory 27, the communications system 29, among other contemplated elements) of the control and communications system 26, such components may be integrated with the transmission controller 28. In some examples, the transmission controller 28 may be an integrated circuit configured to include functional elements of one or both of the transmission controller 28 and the power transmitter 20, generally.

As illustrated, the transmission controller 28 is in operative association, for the purposes of data transmission, receipt, and/or communication, with, at least, the memory 27, the communications system 29, the power conditioning system 40, the driver 48, and the sensing system 50. The driver 48 may be implemented to control, at least in part, the operation of the power conditioning system 40. In some examples, the driver 48 may receive instructions from the transmission controller 28 to generate and/or output a generated pulse width modulation (PWM) signal to the power conditioning system 40. In some such examples, the PWM signal may be configured to drive the power conditioning system 40 to output electrical power as an alternating current signal, having an operating frequency defined by the PWM signal.

The sensing system 50 may include one or more sensors, wherein each sensor may be operatively associated with one or more components of the power transmitter 20 and configured to provide information and/or data. The term "sensor" is used in its broadest interpretation to define one or more components operatively associated with the power transmitter 20 that operate to sense functions, conditions, electrical characteristics, operations, and/or operating characteristics of one or more of the power transmitter 20, the power receiver 30, the input power source 12, the base station 11, the transmission coil 21, the receiver coil 31, along with any other components and/or subcomponents thereof.

Figure 4:
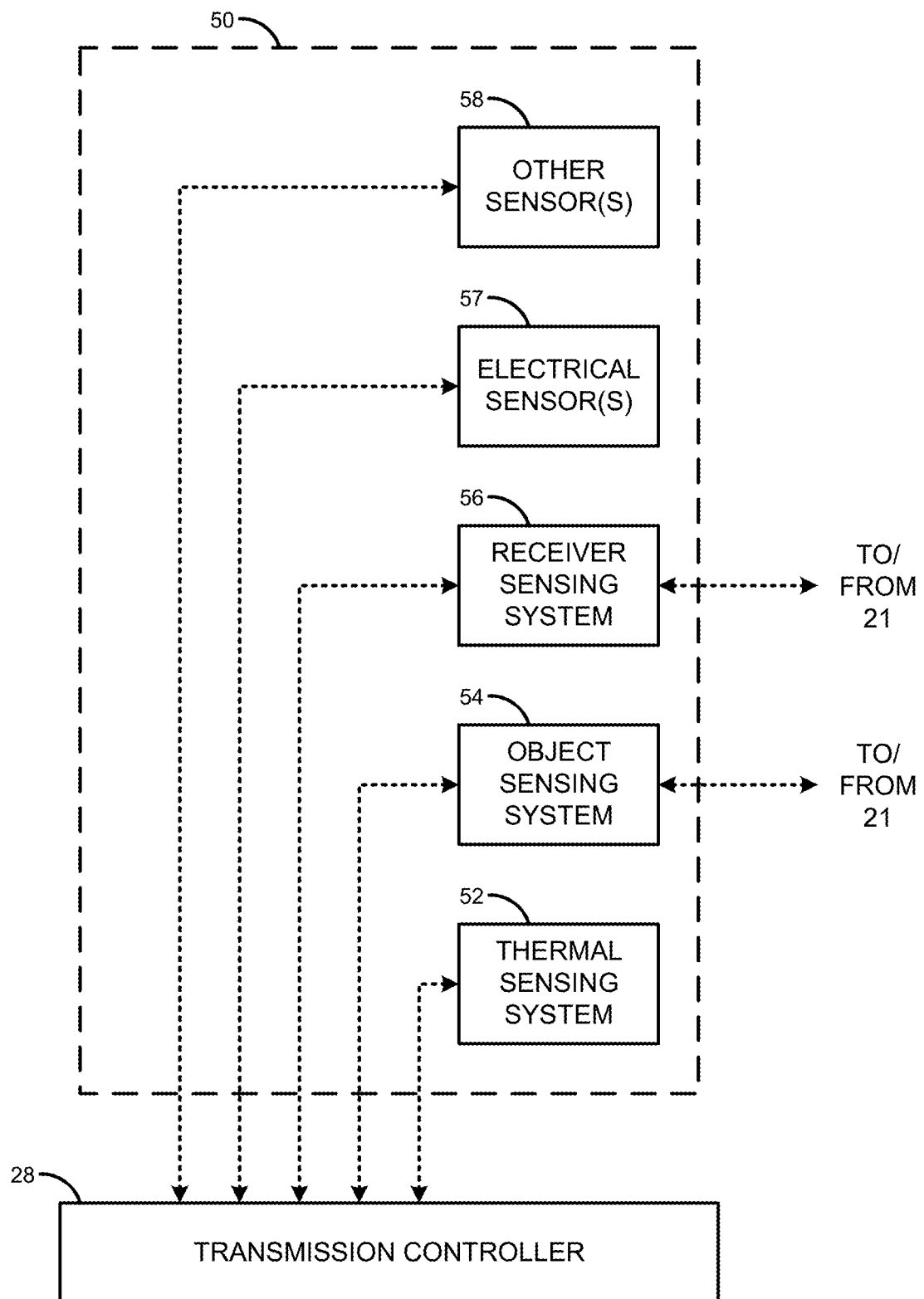
FIG. 4 is an exemplary block diagram for components of a sensing system of the control and communications system of FIG. 3, in accordance with FIGS. 1-3 and an embodiment of the present disclosure.

As illustrated in the embodiment of FIG. 4, the sensing system 50 may include, but is not limited to including, a thermal sensing system 52, an object sensing system 54, a receiver sensing system 56, electrical sensor(s) 57 and/or any other sensor(s) 58. Within these systems, there may exist even more specific optional additional or alternative sensing systems addressing particular sensing aspects required by an application, such as, but not limited to: a condition-based maintenance sensing system, a performance optimization sensing system, a state-of-charge sensing system, a temperature management sensing system, a component heating sensing system, an IoT sensing system, an energy and/or power management sensing system, an impact detection sensing system, an electrical status sensing system, a speed detection sensing system, a device health sensing system, among others. The object sensing system 54, may be a foreign object detection (FOD) system.

Each of the thermal sensing system 52, the object sensing system 54, the receiver sensing system 56 and/or the other sensor(s) 58, including the optional additional or alternative systems, are operatively and/or communicatively connected to the transmission controller 28. The thermal sensing system 52 is configured to monitor ambient and/or component temperatures within the power transmitter 20 or other elements nearby the power transmitter 20. The thermal sensing system 52 may be configured to detect a temperature within the power transmitter 20 and, if the detected temperature exceeds a threshold temperature, the transmission controller 28 prevents the power transmitter 20 from operating. Such a threshold temperature may be configured for safety considerations, operational considerations, efficiency considerations, and/or any combinations thereof. In a non-limiting example, if, via input from the thermal sensing system 52, the transmission controller 28 determines that the temperature within the power transmitter 20 has increased from an acceptable operating temperature to an undesired operating temperature (e.g., in a non-limiting example, the internal temperature increasing from about 20° Celsius (C) to about 50° C., the transmission controller 28 prevents the operation of the power transmitter 20 and/or reduces levels of power output from the power transmitter 20. In some non-limiting examples, the thermal sensing system 52 may include one or more of a thermocouple, a thermistor, a negative temperature coefficient (NTC) resistor, a resistance temperature detector (RTD), and/or any combinations thereof.

As depicted in FIG. 4, the transmission sensing system 50 may include the object sensing system 54. The object sensing system 54 may be configured to detect presence of unwanted objects in contact with or proximate to the power transmitter 20. In some examples, the object sensing system 54 is configured to detect the presence of an undesired object. In some such examples, if the transmission controller 28, via information provided by the object sensing system 54, detects the presence of an undesired object, then the transmission controller 28 prevents or otherwise modifies operation of the power transmitter 20. In some examples, the object sensing system 54 utilizes an impedance change detection scheme, in which the transmission controller 28 analyzes a change in electrical impedance observed by the transmission coil 21 against a known, acceptable electrical impedance value or range of electrical impedance values. Additionally or alternatively, in some examples the object sensing system 54 may determine if a foreign object is present by measuring power output associated with the power transmitter 20 and determining power input associated with a receiver associated with the power transmitter 20. In such examples, the object sensing system 54 may calculate a difference between the power associated with the power transmitter 20 and the power associated with the receiver and determine if the difference indicates a loss, consistent with a foreign object not designated for wireless power transmission.

Additionally or alternatively, the object sensing system 54 may utilize a quality factor (Q) change detection scheme, in which the transmission controller 28 analyzes a change from a known quality factor value or range of quality factor values of the object being detected, such as the receiver coil 31. The "quality factor" or "Q" of an inductor can be defined as (frequency (Hz)×inductance (H))/resistance (ohms), where frequency is the operational frequency of the circuit, inductance is the inductance output of the inductor and resistance is the combination of the radiative and reactive resistances that are internal to the inductor. "Quality factor," as defined herein, is generally accepted as an index (figure of measure) that measures the efficiency of an apparatus like an antenna, a circuit, or a resonator. In some examples, the object sensing system 54 may include one or more of an optical sensor, an electro-optical sensor, a Hall effect sensor, a proximity sensor, and/or any combinations thereof.

The receiver sensing system 56 is any sensor, circuit, and/or combinations thereof configured to detect presence of any wireless receiving system that may be couplable with the power transmitter 20. In some examples, if the presence of any such wireless receiving system is detected, wireless transmission of electrical energy, electrical power, electromagnetic energy, and/or data by the power transmitter to said wireless receiving system is enabled. In some examples, if the presence of a wireless receiver system is not detected, wireless transmission of electrical energy, electrical power, electromagnetic energy, and/or data is prevented from occur-ring. Accordingly, the receiver sensing system 56 may include one or more sensors and/or may be operatively associated with one or more sensors that are configured to analyze electrical characteristics within an environment of or proximate to the power transmitter 20 and, based on the electrical characteristics, determine presence of a power receiver 30.

The electrical sensor(s) 57 may include any sensors configured for detecting and/or measuring any current, voltage, and/or power within the power transmitter 20. Information provided by the electrical sensor(s) 57, to the transmission controller 28, may be utilized independently and/or in conjunction with any information provided to the transmission controller 28 by one or more of the thermal sensing system 52, the object sensing system 54, the receiver sensing system 56, the other sensor(s) 58, and any combinations thereof.

Figure 5:
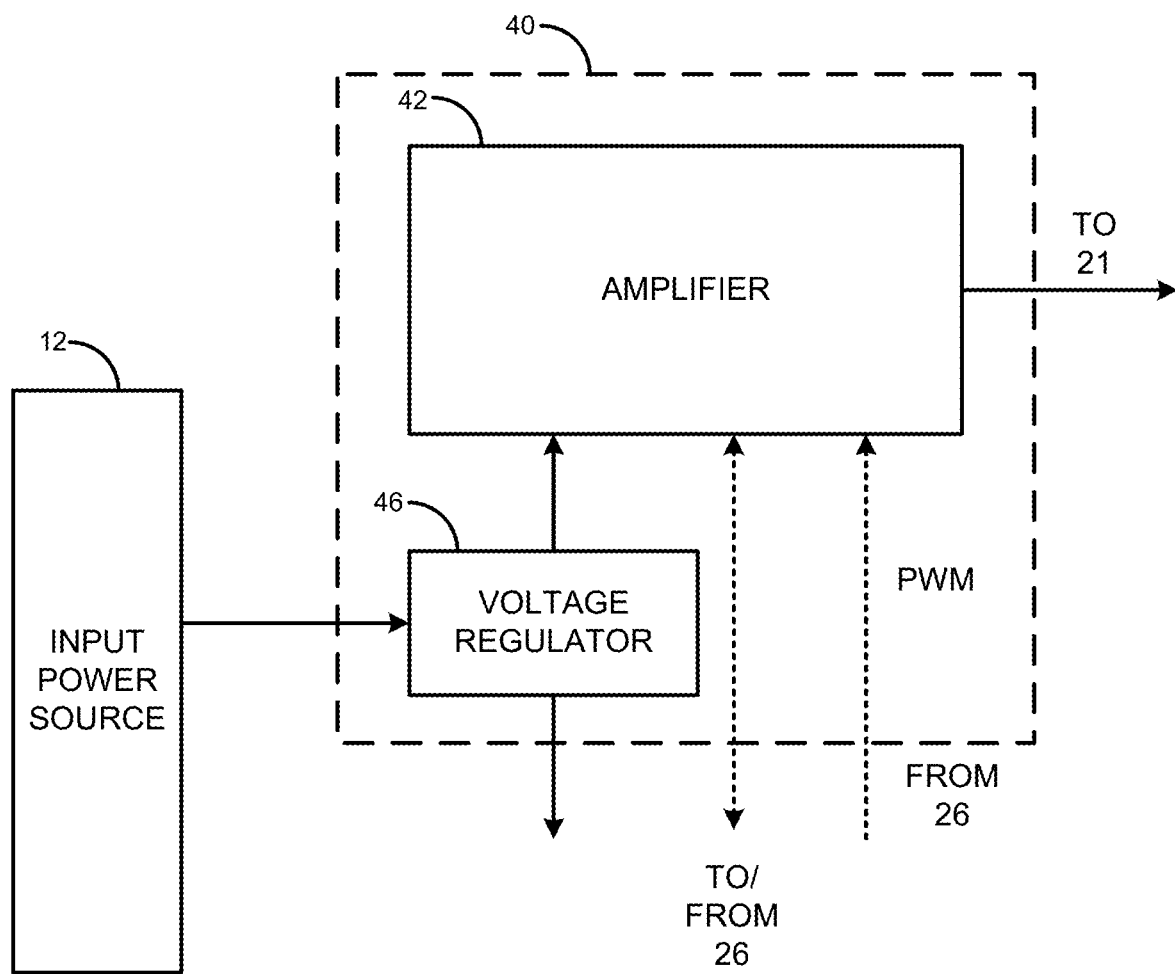
FIG. 5 is an exemplary block diagram for components of a power conditioning system of the power transmitter of FIGS. 1-2, in accordance with FIGS. 1-2 and an embodiment of the present disclosure.

Referring now to FIG. 5, and with continued reference to FIGS. 1-4, a block diagram illustrating an embodiment of the power conditioning system 40 is illustrated. At the power conditioning system 40, electrical power is received, generally, as a DC power source, via the input power source 12 itself or an intervening power converter, converting an AC source to a DC electrical source (not shown). A voltage regulator 46 receives the electrical power from the input power source 12 and is configured to provide electrical power for transmission by the coil 21 and provide electrical power for powering components of the power transmitter 20. Accordingly, the voltage regulator 46 is configured to convert the received electrical power into at least two electrical power signals, each at a proper voltage for operation of the respective downstream components: a first electrical power signal to electrically power any components of the power transmitter 20 and a second portion conditioned and modified for wireless transmission to the wireless receiver system 30. As illustrated in FIG. 3, such a first portion is transmitted to, at least, the sensing system 50, the transmission controller 28, and the communications system 29; however, the first portion is not limited to transmission to just these components and can be transmitted to any electrical components of the power transmitter 20.

The second portion of the electrical power is provided to an amplifier 42 of the power conditioning system 40, which is configured to condition the electrical power for wireless transmission by the coil 21. The amplifier may function as an inverter, which receives an input DC power signal from the voltage regulator 46 and generates an AC as output, based, at least in part, on PWM input from the transmission control system 26. The amplifier 42 may be or include, for example, a power stage inverter. The use of the amplifier 42 within the power conditioning system 40 and, in turn, the power transmitter 20 enables wireless transmission of electrical signals having much greater amplitudes than if transmitted without such an amplifier. For example, the addition of the amplifier 42 may enable the wireless transmission system 20 to transmit electrical energy as an electrical power signal having electrical power from about 10 milliwatts (mW) to about 60 W.

Figure 6:
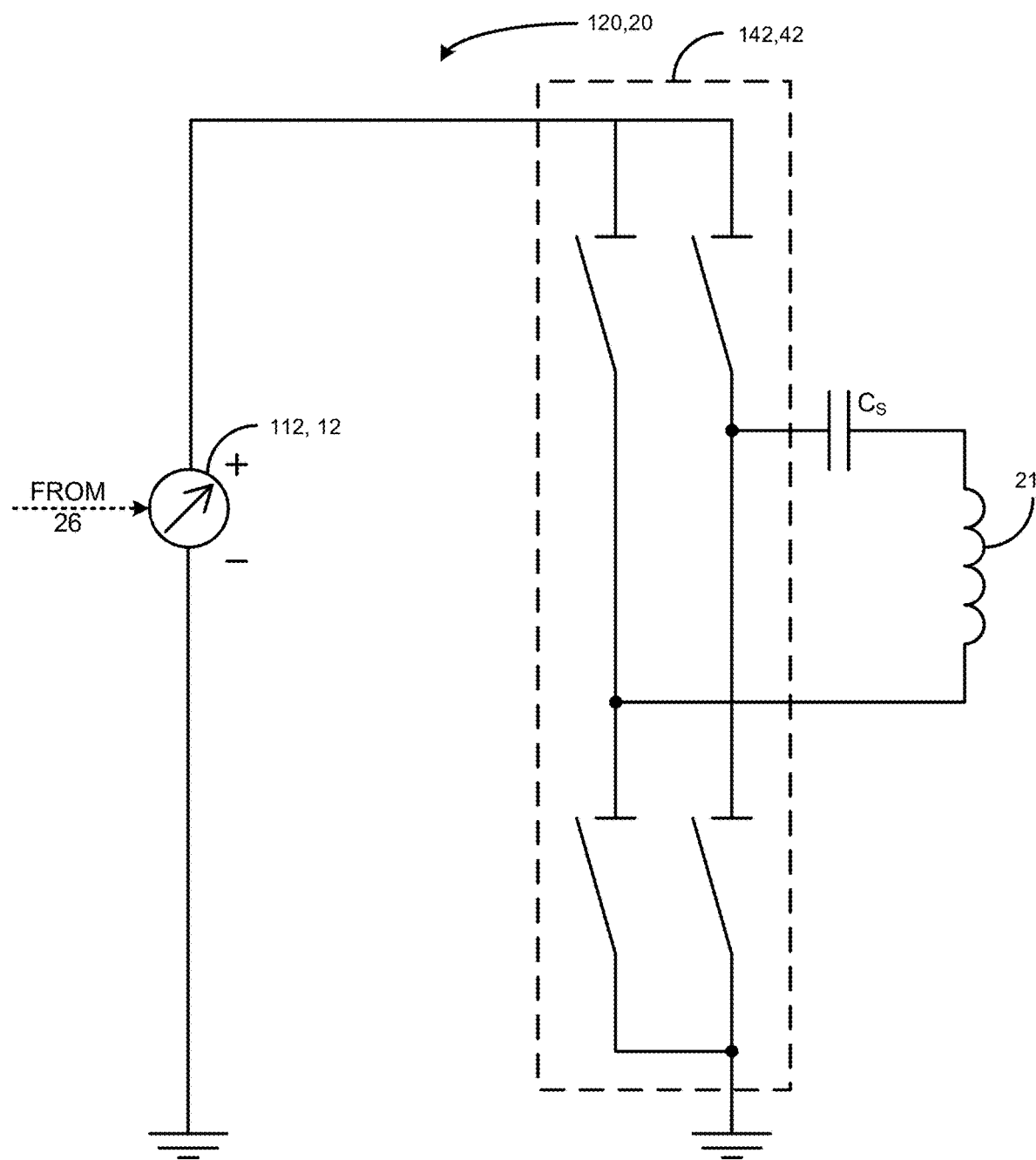
FIG. 6 is an exemplary electrical schematic diagram of components of the power transmitter of FIGS. 1-5, in accordance with FIGS. 1-5 and the present disclosure.

FIG. 6 is an exemplary schematic diagram 120 for an embodiment of the power transmitter 20. In the schematic, the amplifier 42 is a full-bridge inverter 142 which drives the transmitter coil 21 and a series capacitor Cs. In some examples, wherein the operating frequency of the power transmitter 20 is in the range of about 87 kHz and about 205 kHz, the transmitter coil 21 has a self-inductance in a range of about 5 μH to about 7 μH. In some such examples, Cs has a capacitance in a range of about 400 nF to about 450 nF.

Based on controls configured by the control and communications system 26, an input power source 112, embodying the input power source 12, is altered to control the amount of power transferred to the power receiver 30. The input voltage of the input power source 112 to the full-bridge inverter 142 may be altered within a range of about 1 volt (V) to about 19 V, to control power output. In such examples, the resolution of the voltage of the input power source 112 may be 10 millivolts (mV) or less. In some examples, when the power transmitter 20, 120 first applies a power signal for transfer to the power receiver 30, the power signal of the input power source 112 has an initial input power voltage in a range of about 4.5 V to about 5.5 V.

The transmitter coil 21 may be of a wire-wound type, wound of, for example, Litz wire. As defined herein, Litz wire refers to a type of multistrand wire or cable utilized in electronics to carry an alternating current at a frequency. Litz wire is designed to reduce skin effect and proximity effect losses in conductors at frequencies up to about 1 MHz and consists of many thin wire strands, individually insulated and twisted or woven together, following a pattern. In some examples, the Litz wire may be no. 17 American Wire Gauge (AWG) (1.15 mm) type 2 Litz wire, having 105 strands of no. 40 AWG (0.08 mm diameter), or equivalent wire. In some examples, the Litz wire used for the transmitter coil 21 may be a bifilar Litz wire. To that end, utilizing thicker Litz wire, such as the no. 17 AWG type 2 Litz wire, utilizing bifilar Litz wire, and combinations thereof, may result in an increased Quality Factor (Q) for the transmitter coil 21 and higher Q may be directly related to increases in gap 17 height and/or Z-Distance. As Q is directly related to the magnitude of the magnetic field produced by the transmitter antenna 21 and, thus, with a greater magnitude magnetic field produced, the field emanating from the transmission antenna 21 can reach greater Z-distances and/or charge volumes, in comparison to legacy transmission coils, having lower Q designs. While Litz wire is described and illustrated, other equivalents and/or functionally similar wires may be used. Furthermore, other sizes and thicknesses of Litz wire may be used.

Figure 7:
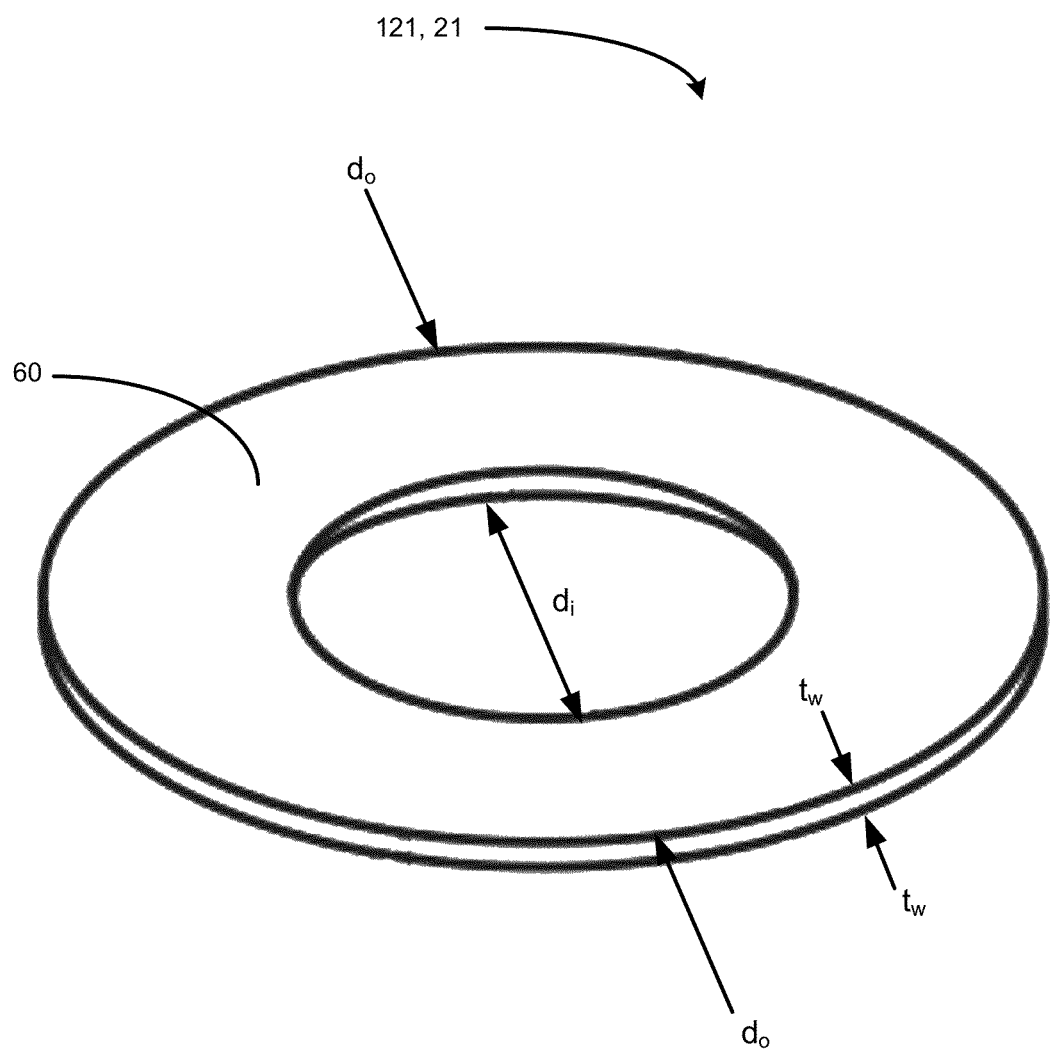
FIG. 7 is a perspective view of a shape of a transmitter coil of the power transmitter of FIGS. 1-6, in accordance with FIGS. 1-6 and an embodiment of the present disclosure.

Turning to FIG. 7, an exemplary diagram 121, for portraying dimensions of the transmitter antenna 21, is illustrated. The diagram 121 is a top perspective view of the transmitter antenna 21 and shows a top face 60 of the transmitter antenna 21. Note that the diagram 121 is not necessarily to scale and is for illustrative purposes. The top face 60 and the transmitter antenna 21, generally, are relatively circular in shape. As illustrated, an outer diameter $d_o$ is defined as an exterior diameter of the transmitter antenna 21. In some examples, the outer diameter $d_o$ has an outer diameter length in a range of about 40 mm to about 50 mm. An inner diameter $d_i$ is defined as the diameter of the void space in the interior of the transmitter antenna 21. The inner diameter $d_i$ may have an inner diameter length in a range of about 15 mm to about 25 mm. The outer diameter $d_o$ and the inner diameter $d_i$ may be relatively concentric, with respect to one another. The transmitter coil 21 has a thickness $t_w$, which is defined as the thickness of the wire of the coil. The thickness $t_w$ may be in a range of about 2 mm to about 3 mm. In such examples, the transmitter coil 21 may be made of Litz wire and include at least two layers, the at least two layers stacked upon each other. Utilization of one or more of an increased inner diameter an increased outer diameter $d_o$, multiple Litz wire layers for the antenna 21, specific dimensions disclosed herein, and/or combinations thereof, may be beneficial in achieving greater gap 17 heights and/or Z-distances. Other shapes and sizes of the transmitter antenna 21 may be selected based on the configuration with the selection of the shape and size of the shielding of the transmitter coil. In the event that a desired shielding in required, the transmitter antenna 21 may be shaped and sized such that the shielding surrounds the transmitter antenna 21 in accordance with an embodiment.

Figure 8:
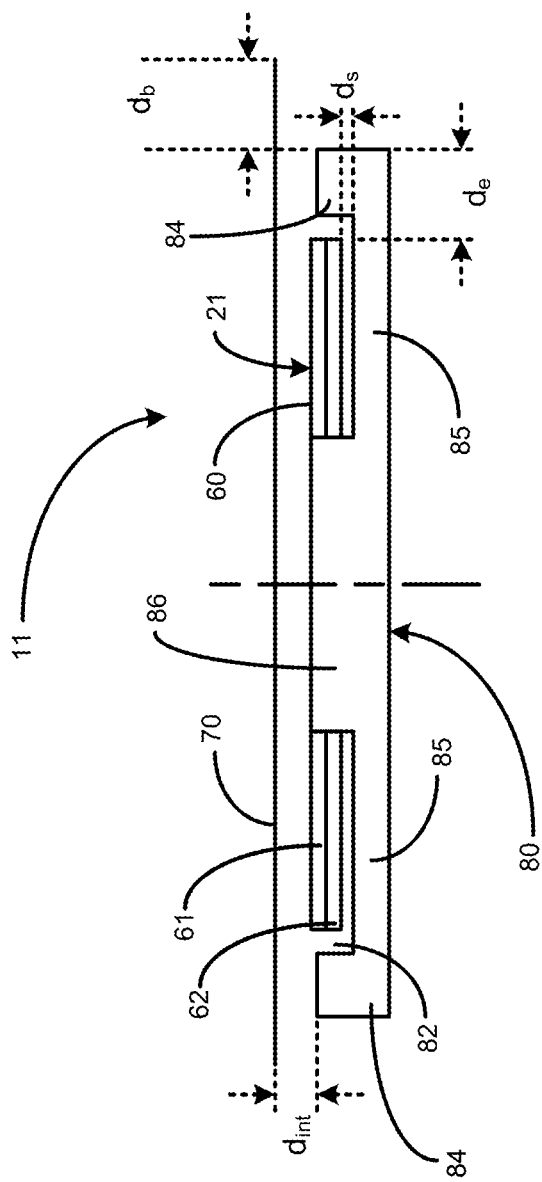
FIG. 8 is a cross-section of components of a base station, with which the power transmitter 20 is associated, in accordance with FIGS. 1-7 and the present disclosure.

Turning now to FIG. 8, a cross-sectional view of the transmitter coil 21, within the base station 11 and partially surrounded by a shielding 80 of the transmitter coil 21, is illustrated. The shielding 80 comprises a ferrite core and defines a cavity 82, the cavity configured such that the ferrite core substantially surrounds all but the top face 60 of the transmitter antenna 21 when the transmitter antenna 21 is placed in the cavity. As used herein, "surrounds" is intended to include covers, encircles, enclose, extend around, or otherwise provide a shielding for. "Substantially surrounds," in this context, may take into account small sections of the coil that are not covered. For example, power lines may connect the transmitter coil 21 to a power source. The power lines may come in via an opening in the side wall of the shielding 80. The transmitter coil 21 at or near this connection may not be covered. In another example, the transmitter coil 21 may rise slightly out of the cavity and thus the top section of the side walls may not be covered. By way of example, substantially surrounds would include coverage of at least 50+% of that section of the transmitter antenna. However, in other examples, the shielding may provide a greater or lesser extent of coverage for one or more sides of the transmitter antenna 21.

In an embodiment, as shown in FIG. 8, the shielding 80 surrounds at least the entire bottom section of the transmitter antenna 21 and almost all of the side sections of the transmitter antenna 21. As used herein, the entire bottom section of the transmitter antenna 21 may include, for example, the entire surface area of the transmitter antenna 21 or all of the turns of the Litz wire of the transmitter antenna 21. With respect to the side walls, as shown in FIG. 8, the magnetic ring 84 does not extend all the way up the side wall of the transmitter antenna 21. However, as shown in other illustrations, the side wall may extend all the way up the side wall.

Figure 10A:
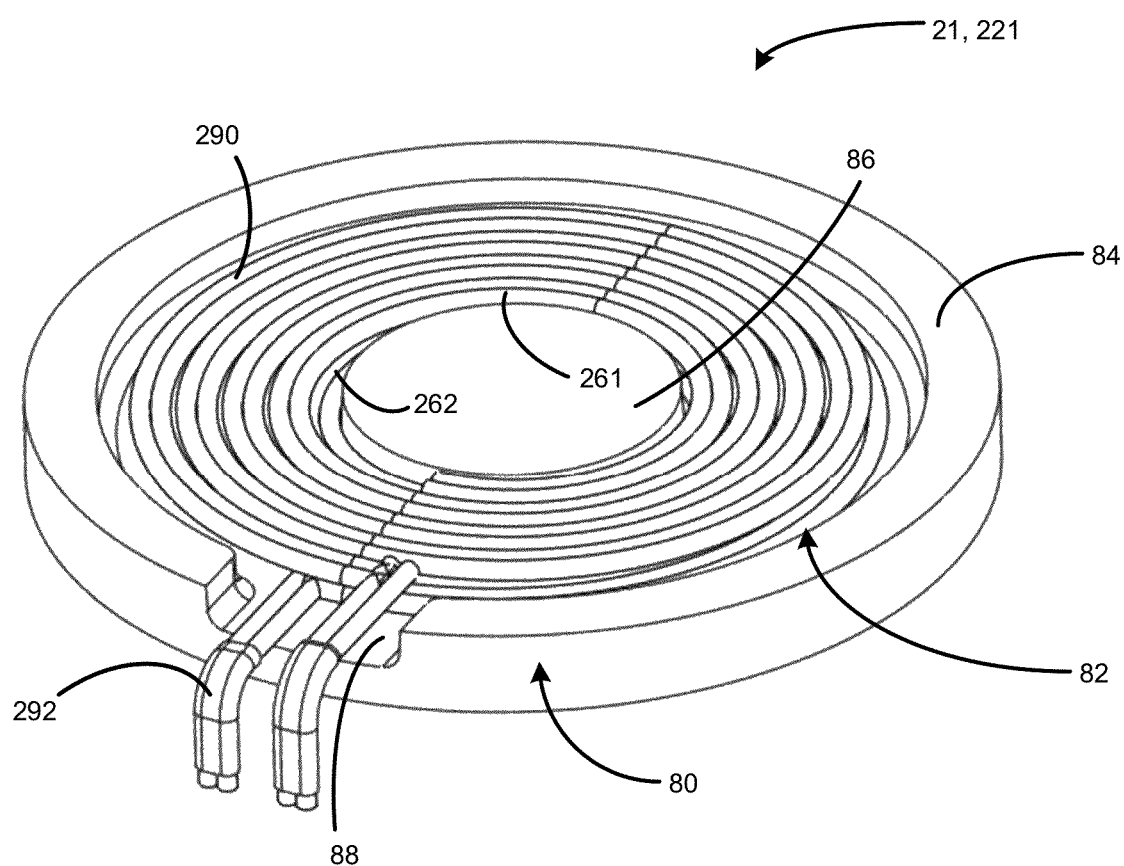
FIG. 10A is a perspective view of the transmitter coil of FIGS. 1-8 and the shielding of FIGS. 8 and 9, in accordance with FIGS. 1-9 and the present disclosure.
Figure 10B:
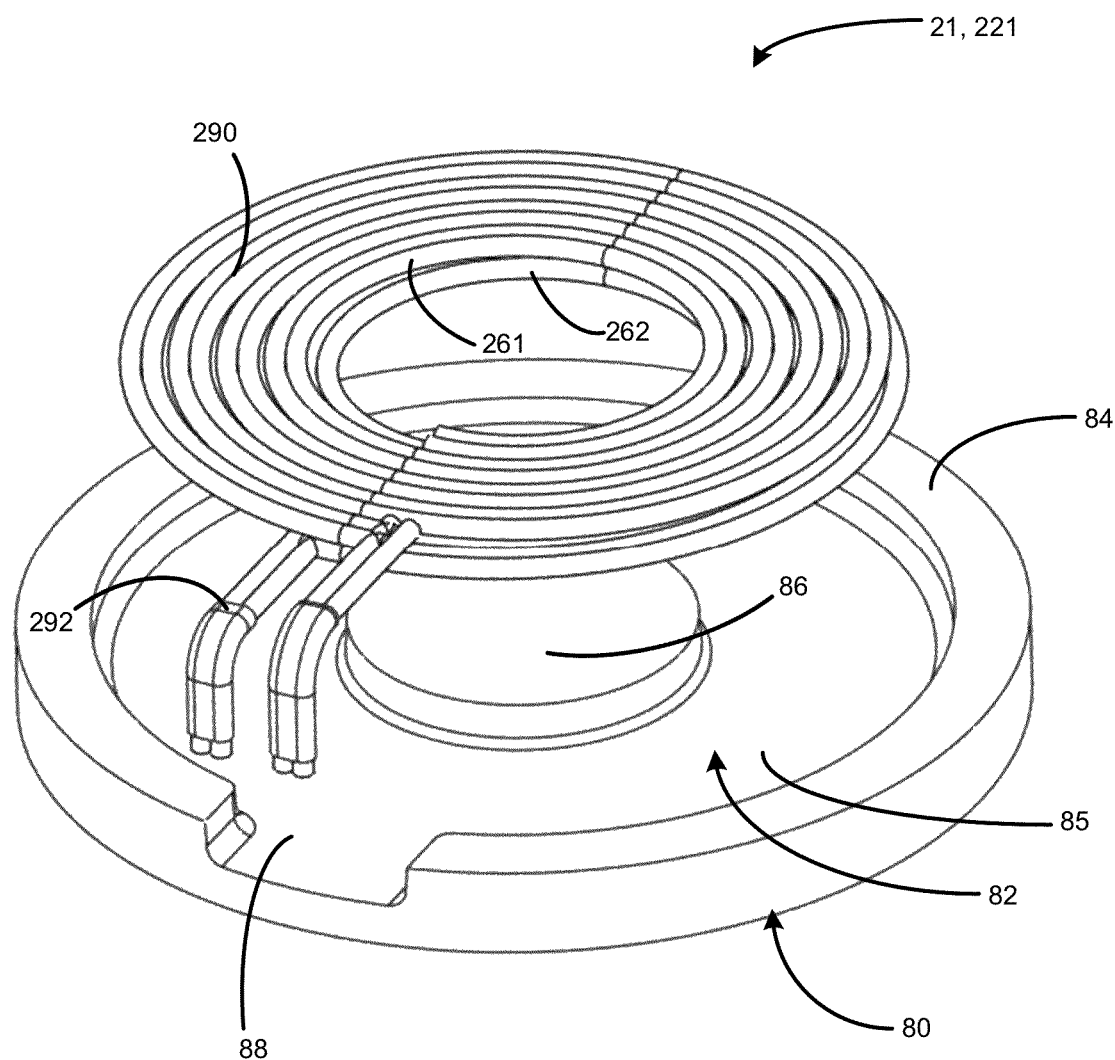
FIG. 10B is an exploded perspective view of the transmitter coil of FIGS. 1-8 and the shielding of FIGS. 8 and 9, in accordance with FIGS. 1-9 and the present disclosure.

In another embodiment, the shielding 80 may surround less than the entire bottom section of the transmitter antenna 21. For example, connecting wires (e.g., connecting wires 292, as best illustrated in FIGS. 10A, 10B and discussed below) may be run through an opening in the bottom of the shielding 80.

In an embodiment, as shown in FIG. 8, the shielding 80 is an "E-Core" type shielding, wherein the cavity 82 and structural elements of the shielding 80 are configured in an E-shape configuration, when the shielding is viewed, cross-sectionally, in a side view. The E-Core configuration is further illustrated in FIG. 9, which is a perspective view of the shielding 80. The shielding 80 may include a magnetic core 86, a magnetic backing 85, and a magnetic ring 84. The magnetic core 86 is spaced inwardly from the outer edge of the magnetic backing 85 and projects in an upward direction from the top surface of the magnetic backing 85. The magnetic core 86 and the magnetic ring 84 function to surround the transmitter coil 21 and to direct and focus magnetic fields, hence improving coupling with the receiver coil 31 of the power receiver 30.

In addition to covering the entire outer diameter of the transmitter coil 21, the shielding 80 may also cover the inner diameter $d_i$ of the transmitter coil 21. That is, as shown, the inner section of the E-Core configuration may protrude upward through the middle of the transmitter coil 21.

In an embodiment, the cavity 82 is configured such that the shielding 80 covers the entire bottom section of the transmitter coil 21 and the entire side sections of the transmitter coil 21. The top section of the transmitter coil 21 is not covered. The bottom section of the transmitter coil 21 is the side of the transmitter coil 21 that is opposite of the direction of the primary power transfer to the receiver coil 31. With a wire wound transmitter coil 21, the side section of the transmitter coil 21 includes the side section of the outer most winding of the coil 21.

Figure 9:
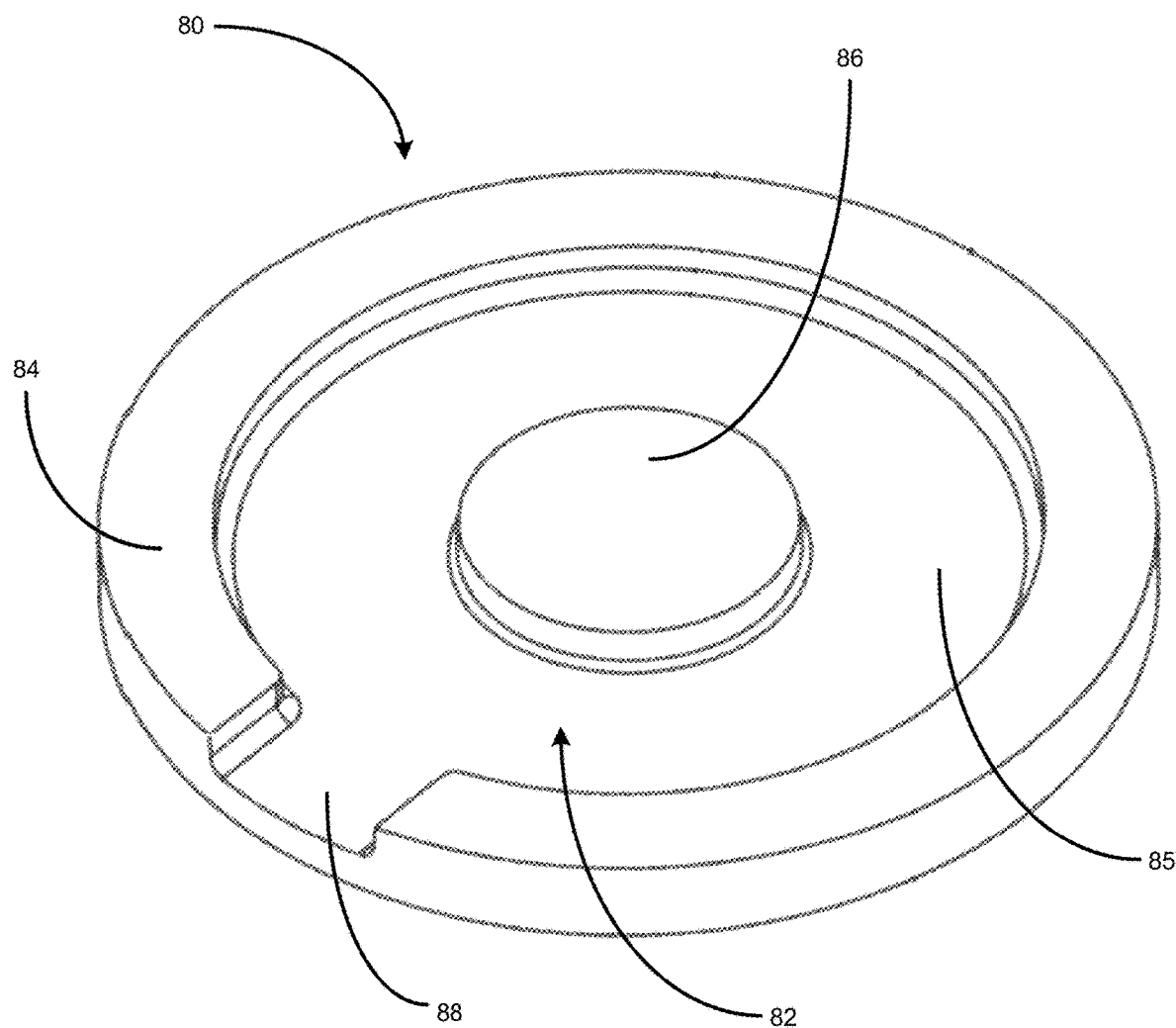
FIG. 9 is a perspective view of a shielding associated with the transmitter coil of FIGS. 1-8, in accordance with FIGS. 1-8 and an embodiment of the present disclosure.

FIG. 10A is a perspective view of the transmitter coil 21 and the embodiment of the E-core shielding of FIG. 9 and FIG. 10B is an exploded perspective view of the transmitter coil 21 and the embodiment of the E-core shielding of FIG. 9. The transmitter coil 21 is positioned above the shielding 80, whose combination of structural bodies, as discussed above, may include the combination of the magnetic core 86, the magnetic backing 85, and magnetic ring 84. This magnetic shielding combination functions to help direct and concentrate magnetic fields created by transmitter coil 21 and can also limit side effects that would otherwise be caused by magnetic flux passing through nearby metal objects. In some examples, the magnetic ring defines an opening 88, in which a connecting wire 292 of the transmitter coil 21 can exit the shielding 80.

As defined herein, a "shielding material," from which the shielding 80 is formed, is a material that captures a magnetic field. An example of which is a ferrite material. The ferrite shield material selected for the shielding 80 also depends on the operating frequency, as the complex magnetic permeability ($\mu=\mu'-j*\mu''$) is frequency dependent. The material may be a sintered flexible ferrite sheet or a rigid shield and be composed of varying material compositions. In some examples, the ferrite material for the shielding 80 may include a Ni—Zn ferrite, a Mn—Zn ferrite, and any combinations thereof.

Returning now to FIG. 8 and with continued reference to FIGS. 9 and 10, the shielding 80 is aligned with the transmitter antenna 21 such that the shielding 80 substantially surrounds the transmitter antenna 21 on all sides, aside from the top face 60. In other words, the transmitter antenna 21 may be wound around the magnetic core 86 and be surrounded, on the bottom and sides, respectively, by the magnetic backing 85 and the magnetic ring 84. As illustrated, the shielding 80, in the form of one or both of the magnetic backing and the magnetic core, may extend beyond the outer diameter $d_o$ of the transmitter antenna 21 by a shielding extending distance $d_e$. In some examples, the shielding extending distance $d_e$ may be in a range of about 5 mm to about 6 mm. The shielding 80, at the magnetic backing 85, and the transmitter coil 21 are separated from one another by a separation distance $d_s$, as illustrated. In some examples, the separation distance $d_s$ may be in a range of about 0.1 mm and 0.5 mm.

An interface surface 70 of the base station 11 is located at an interface gap distance $d_{int}$ from the transmitter coil 21 and the shielding 80. The interface surface 70 is a surface on the base station 11 that is configured such that when a power receiver 30 is proximate to the interface surface 70, the power receiver 30 is capable of coupling with the power transmitter 20, via near-field magnetic induction between the transmitter antenna 21 and the receiver antenna 31, for the purposes of wireless power transfer. In some examples, the interface gap distance $d_{int}$ maybe in a range of about 8 mm to about 10 mm. In such examples, the $d_{int}$ is greater than the standard required Z-distance for Qi™ certified wireless power transmission (3-5 mm). Accordingly, by having a greater $d_{int}$, empty space and/or an insulator can be positioned between the transmission coil 21 and the interface surface 70 to mitigate heat transfer to the interface surface 70, the power receiver 30, and/or the electronic device 14 during operation. Further, such a greater $d_{int}$ allows for interface design structures in which objects on or attached to the electronic device 14 may remain attached to the electronic device during operation. As described in greater detail below, design features of the interface surface 70 may be included for interaction with such objects for aligning the power transmitter 20 and the power receiver 30 for operation.

Returning now to FIG. 10B, an exemplary coil 221 for use as the transmitter antenna 21 is illustrated in the exploded view of the transmitter antenna 21 and shielding 80. The coil 221 includes one or more bifilar Litz wires 290 for the first bifilar coil layer 261 and the second bifilar coil layer 262. "Bifilar," as defined herein, refers to a wire having two closely spaced, parallel threads and/or wires. Each of the first and second bifilar coil layers 261, 262 include N number of turns. In some examples, each of the first and second bifilar coil layers 261, 262 include about 4.5 turns and/or the bifilar coil layers 261, 262 may include a number of turns in a range of about 4 to about 5. In some examples, the one or more bifilar Litz wire 290 may be no. 17 AWG (1.15 mm) type 2 Litz wire, having 105 strands of no. 40 AWG (0.08 mm diameter), or equivalent wire. Utilization of multiple layers, thick Litz wire, bifilar Litz wire, and any combinations thereof, may result in the coil 21 achieving greater Q and/or may result in increases in gap 17 height and/or Z-distance between the coil 21 and a receiver coil.

FIGS. 11A-E illustrate a surface mountable power transmitter 420, which may include similar and/or equivalent elements to the power transmitter 20 including, but not limited to the transmitter antenna 21, the control and communications unit 26, the power conditioning system 40, the sensing system 50, any components of the aforementioned elements, or any combinations thereof. In addition to the cited elements of the power transmitter 20, the surface mountable power transmitter 420 further includes a surface mountable housing 400. The surface mountable housing 400 is substantially connected to, at least, the transmitter antenna 21.

The surface mountable housing 400 is configured for use to mount, at least, the transmitter antenna 21 to an underside of a structural surface, such that the transmitter antenna 21 is configured to couple with a receiver antenna 31 of the power receiver 30 when the receiver antenna is proximate to a top side of the structural surface. Such configurations of the housing 400 and a structural surface 500 will be discussed in more detail, with respect to FIGS. 12-14. A "structural surface," as defined herein, is any surface made out of a dielectric material wherein a user of the electronic device 14 would desire to provide wireless power transfer to the electronic device 14, and said surface is within an environment where wireless power transfer can occur (e.g., an environment wherein electricity is available to provide to the power transmitter 420). Examples of structural surfaces include, but are not limited to including, a desk, a desk top, a counter, a counter top, a bar, a table, a table top, an end table, an end table top, furniture, outdoor furniture, a chair, a chair arm, an arm rest, a surface of lounge furniture, a surface of interior seating furniture, home theater furniture, stands, a work space surface, a conference room table surface, a wall, a protrusion from a wall, a public surface, a surface of a vehicle, a bar, a bar top, a ledge, a shelf, a book shelf, an entertainment center, a cabinet surface, among other contemplated surfaces and/or portions of surfaces. Such a surface could be made out of, for example, a wood, polymer, concrete, laminated composite, leather, glass, ceramic, foam, among other dielectric materials used for the surface.

Figure 11A:
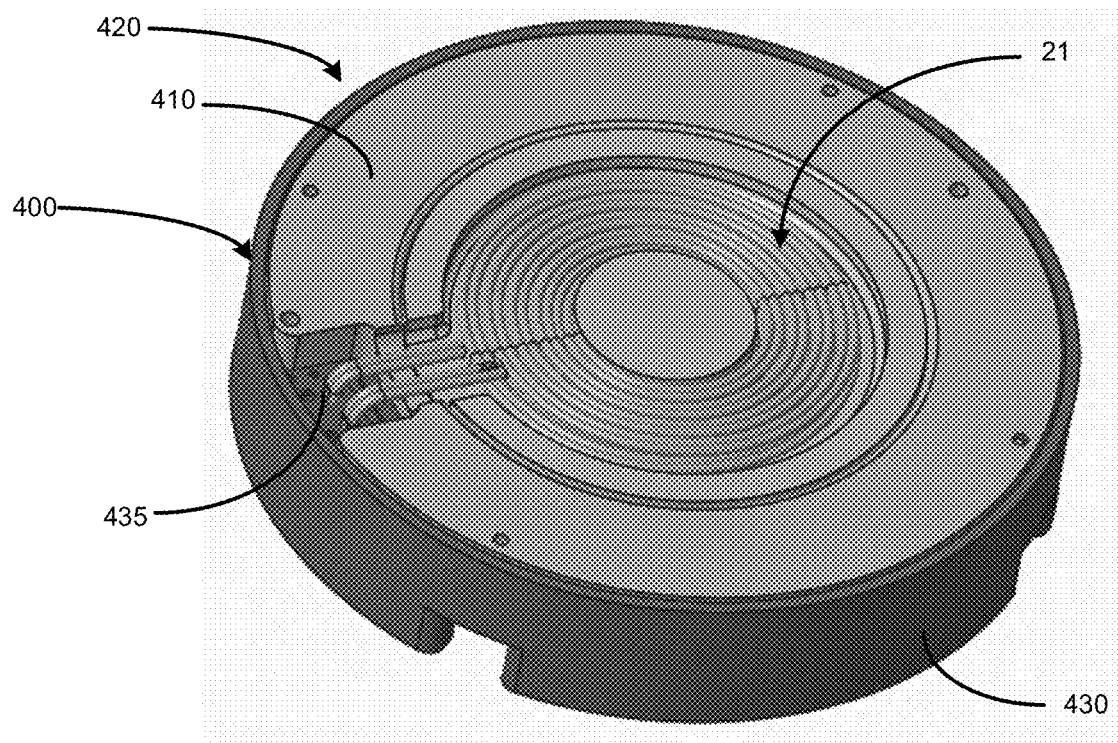
FIG. 11A is a perspective top view of a surface mountable power transmitter utilizing one or more of the power transmitters, the transmitter antennas, or combinations thereof, described in FIGS. 1-10, in accordance with FIGS. 1-10 and the present disclosure.
Figure 11B:
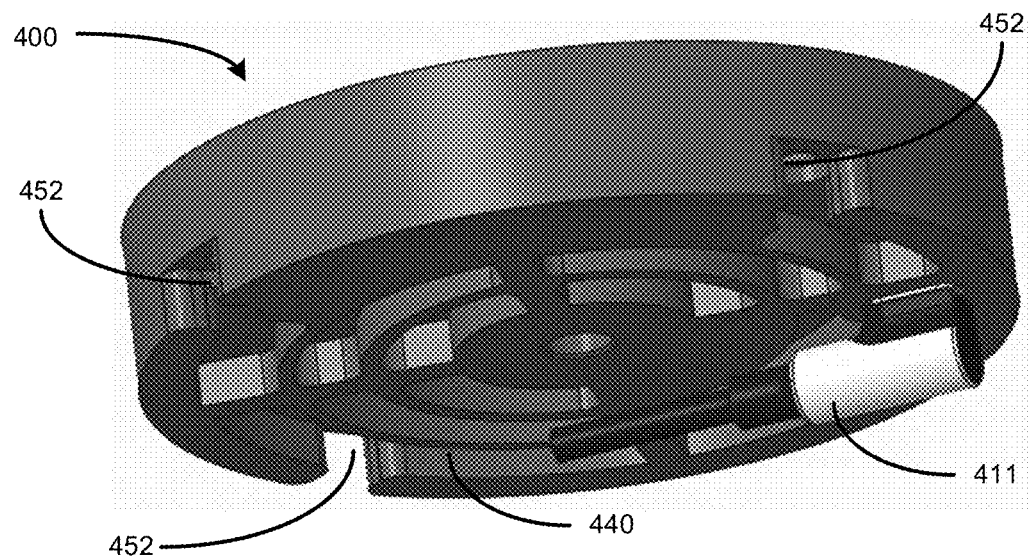
FIG. 11B is a perspective bottom view of the surface mountable power transmitter of FIG. 11A, in accordance with FIGS. 1-11A and the present disclosure.
Figure 11C:
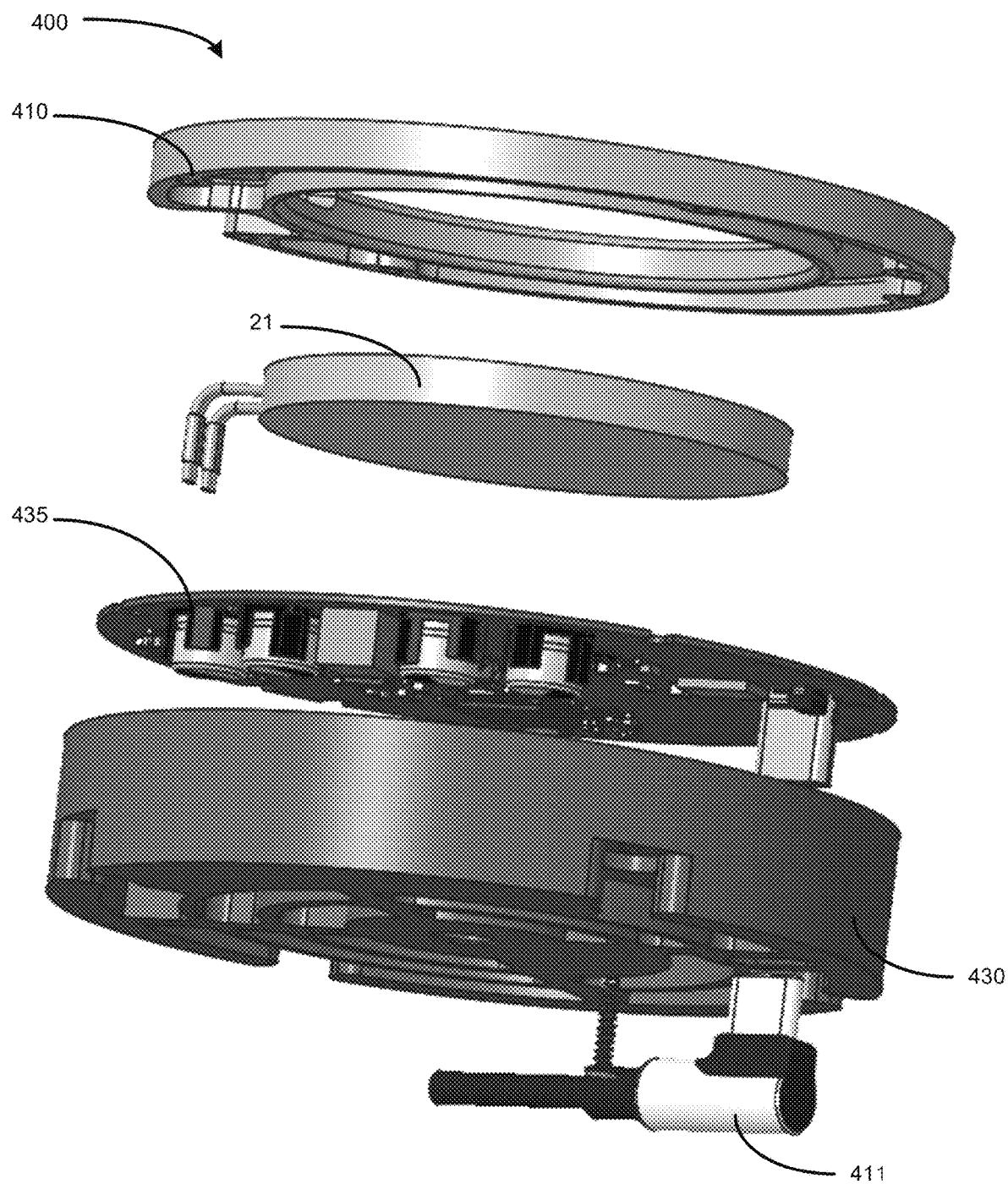
FIG. 11C is an exploded perspective view of the surface mountable power transmitter of FIGS. 11A-B, in accordance with FIGS. 1-11B and the present disclosure.
Figure 11D:
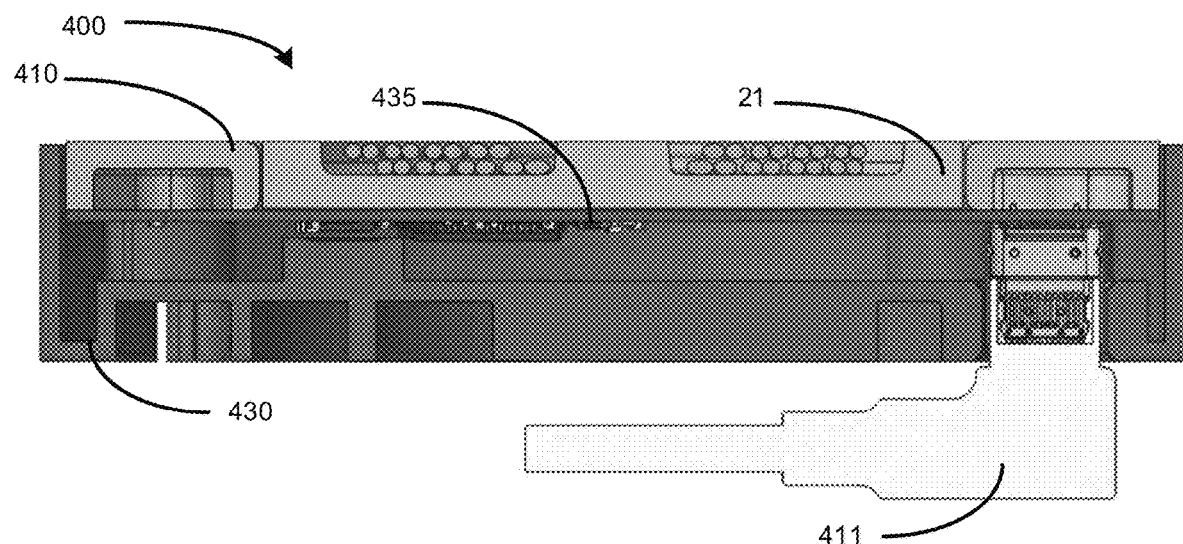
FIG. 11D is a side, cross-sectional view of the surface mountable power transmitter of FIGS. 11-C, in accordance with FIGS. 1-11C and the present disclosure.
Figure 11E:
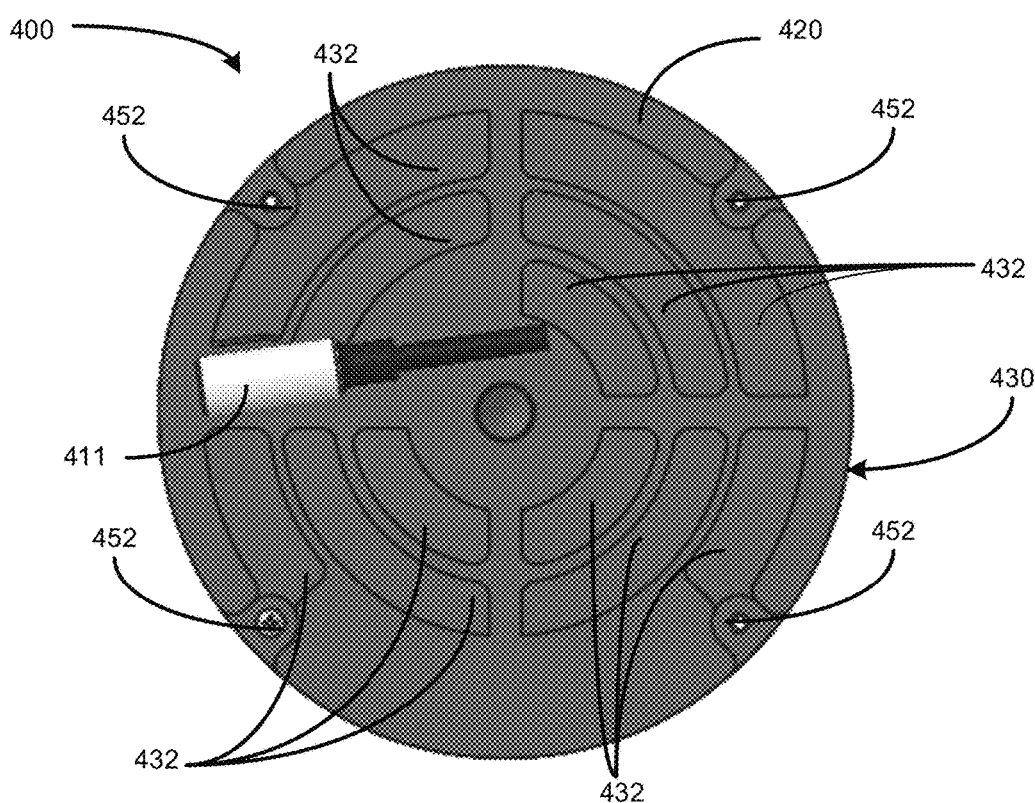
FIG. 11E is a bottom view of the surface mountable power transmitter of FIGS. 11A-D, in accordance with FIGS. 1-11D and the present disclosure.

The surface mountable housing 400 may include a heat sink 430, which is configured to rest, at least in part, below the transmitter antenna (as best illustrated in the exploded view of the housing 400 in FIG. 11C), when the power transmitter 420 is connected to the structural surface 500. The heat sink 430 is configured to direct heat generated by the power transmitter 420 away from, at least, the structural surface 500. In some examples and as best illustrated in FIGS. 11B and 11E, the heat sink 430 may include one or more cut outs, 422, the one or more cutouts configured to increase an external surface area of the heat sink, thus allowing heat to spread over the increased surface area, directing and/or dissipating heat away from the power transmitter 20 components and/or the associated surface. Inclusion of the cutouts 422 results in higher rates of heat dissipation into the environment and, as a result, lower temperatures on the heat sink surfaces and inside the module.

Additionally or alternatively, in some examples, the heat sink 430 may be CNC machined or formed using a die casting, forging, stamping or another manufacturing process suitable for low cost mass production. In some examples, the heat sink 430 may be formed of a metal that has a relatively high thermal conductivity. The heat sink 420, at least in part, can be made out of any metal or metal alloy suitable for die casting and having a high thermal conductivity, such as, but not limited to, an aluminum or an aluminum alloy. In some examples, wherein the heat sink 430 is formed by die casting, one or more surfaces of the heat sink 430 are formed with drafts on an exterior surface of the heat sink 430.

In order to increase emissivity, the heat sink can be finished with different coatings, chemically treated, and/or painted. Increased emissivity increases heat dissipated by the heat sink, reducing temperature rise of the components inside the module 400. In some examples, an aluminum, die-casted heat sink 430 is anodized to produce a uniform black finish, which increases emissivity and, thus, improves heat dissipation by the heat sink 430.

Further, in some examples, the power transmitter 420 includes a transmitter electronics circuit board 435. The circuit board 435 may be any circuit board, upon which components of one or more of the control and communications system 26, the power conditioning system 40, and/or the sensing system 50, among other things, may be connected, mounted, operable with, and/or otherwise operatively associated with the circuit board 430. In such examples, the heat sink 430 is configured to conduct and dissipate heat, generated by one or more of the electronics circuit board 435 and/or any components located on the electronic circuit board 435, away from the structural surface 500. In some examples, the circuit board 435 may be operatively associated with an external power connector 411, which may be configured to interface with the input power source 11 to provide input power to the power transmitter 420. The external power connector 411 may be any input and/or connector that provides an electrical connection to the input power source, such as, but not limited to, a barrel connector, a Universal Serial Bus (USB) connector, a USB-C connector, a mini-USB connector, Lightning connector, a Thunderbolt connector, a proprietary electrical connector, an AC adaptor connector, among other contemplated connectors.

In some examples, a thermal interface material (TIM) 432 is disposed between the electronics circuit board 435 and the heat sink 430. In some examples, the TIM 432 is placed proximate to one or more heat producing components on and/or operatively associated with the electronics circuit board 435 and/or the power transmitter 420. The thermal interface material 432 is configured to displace air and provide a low thermal impedance path between the electronics circuit board 435 components and the heat sink 430. Examples of thermal interface materials include, but are not limited to including a thermal paste, a thermal adhesive, a thermal gap filter, a thermally conductive pad, a thermal tape, a phase-change material, a metal thermal interface, or combinations thereof. In some examples, materials used in the thermal interface materials may include, but are not limited to including materials such as, but not limited to, epoxies, silicones, urethanes, and acrylates, solvent-based systems, hot-melt adhesives, and pressure-sensitive adhesive tapes, Aluminum oxide, boron nitride, zinc oxide, aluminum nitride, Galinstan, gallium, epoxy resins, cyanoacrylate, metal oxides, silica, ceramic microspheres, paraffin wax, copper, among other materials used in thermal interface materials.

In some examples, the housing 400 further includes an antenna housing 410, the antenna housing substantially surrounding a side wall (e.g., the magnetic ring 84 of the shielding 80 of the antenna 21) of the antenna 21. The antenna housing 410 is connected to the heat sink 420, via, for example, a connection system 455 of the housing 400, as discussed below. The antenna housing 410 may be utilized to fix the antenna location within the module, prevent any foreign objects made out of metal to come in vicinity of the antenna, once the module is installed, hold together components of the housing 400 and/or for the purposes of packaging and/or obscuring components of the power transmitter 420 in a finished product of the power transmitter 420. In some examples, portions of the antenna housing 410 may define a portion of the connection system 455, as is discussed in more detail below. In some examples, the antenna housing 410 is formed of an injection moldable polymer and/or any other substantially dielectric materials.

Figure 12:
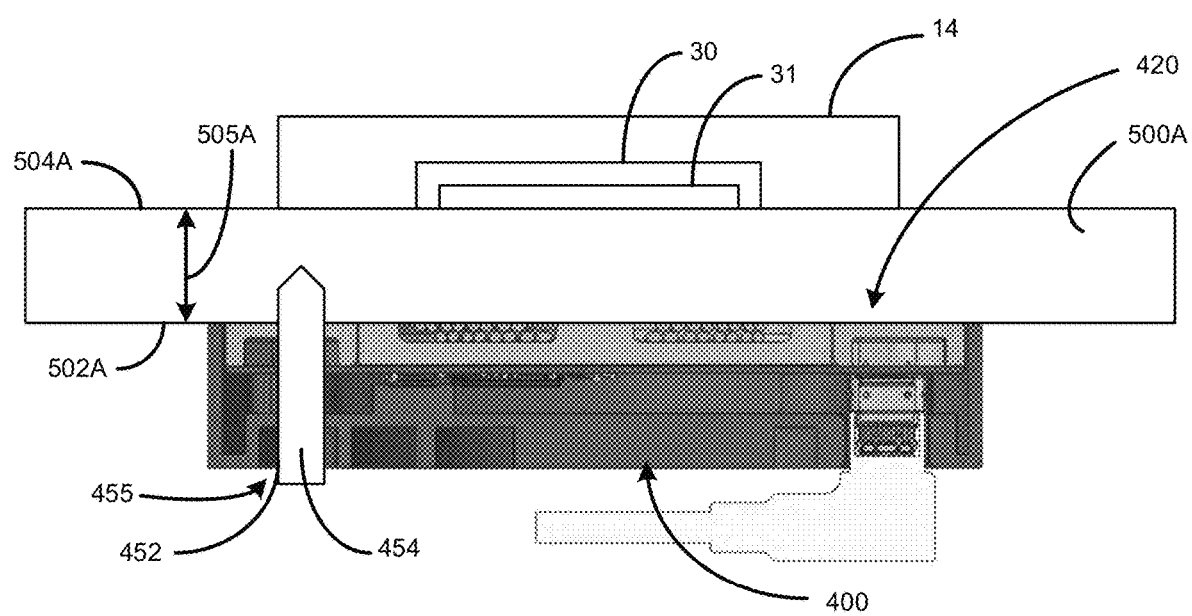
FIG. 12 is cross sectional side view of the surface mountable power transmitter of FIG. 11, illustrating an exemplary usage of the surface mountable power transmitter of FIG. 11, with respect to a surface, in accordance with FIGS. 1-11 and the present disclosure.

Turning now to FIG. 12 and with continued reference to FIGS. 1-11, the power transmitter 420 is illustrated in relation to a first structural surface 500A, to which the power transmitter 420 may be attached and function to transmit wireless power to the power receiver 30 of the electronic device, via coupling between the transmitter antenna 21 and the receiver antenna 31 of the power receiver 30. The structural surface 500A has a top side 504A and an underside 502A; as discussed above, the power transmitter 420 is configured to be mounted to the underside 502A. As best illustrated in FIG. 12, the connection system 455 is included to connect the power transmitter 400 to the underside 502 of the structural surface 500. As illustrated, the connection system 455 may include one or more connection holes 452; the connection holes 452 configured to accept one or more fasteners 454 which may mate with the connection hole 452 and then enter the structural surface 500 to secure the power transmitter 420 to the underside 502. While illustrated as a combination of a holes 452 and fasteners 454, the connection system 455 is certainly not limited to a hole/fastener combination and may be and/or include an adhesive, a removable connector, a connective material connection (e.g. Velcro), a magnetic connection, a sealant connection, a fused connection, among other systems, methods, and apparatus for connecting the power transmitter 420 to the structural surface 500.

Figure 13A:
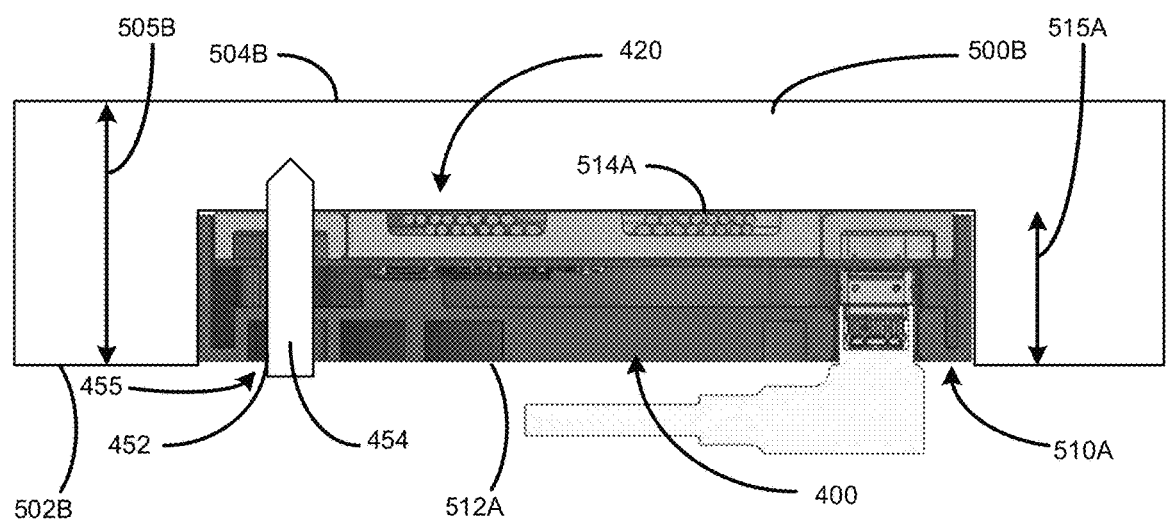
FIG. 13A is a cross sectional side view of the surface mountable power transmitter of FIG. 11, illustrating another exemplary usage of the surface mountable power transmitter of FIG. 11, with respect to a surface, in accordance with FIGS. 1-11 and the present disclosure.
Figure 13B:
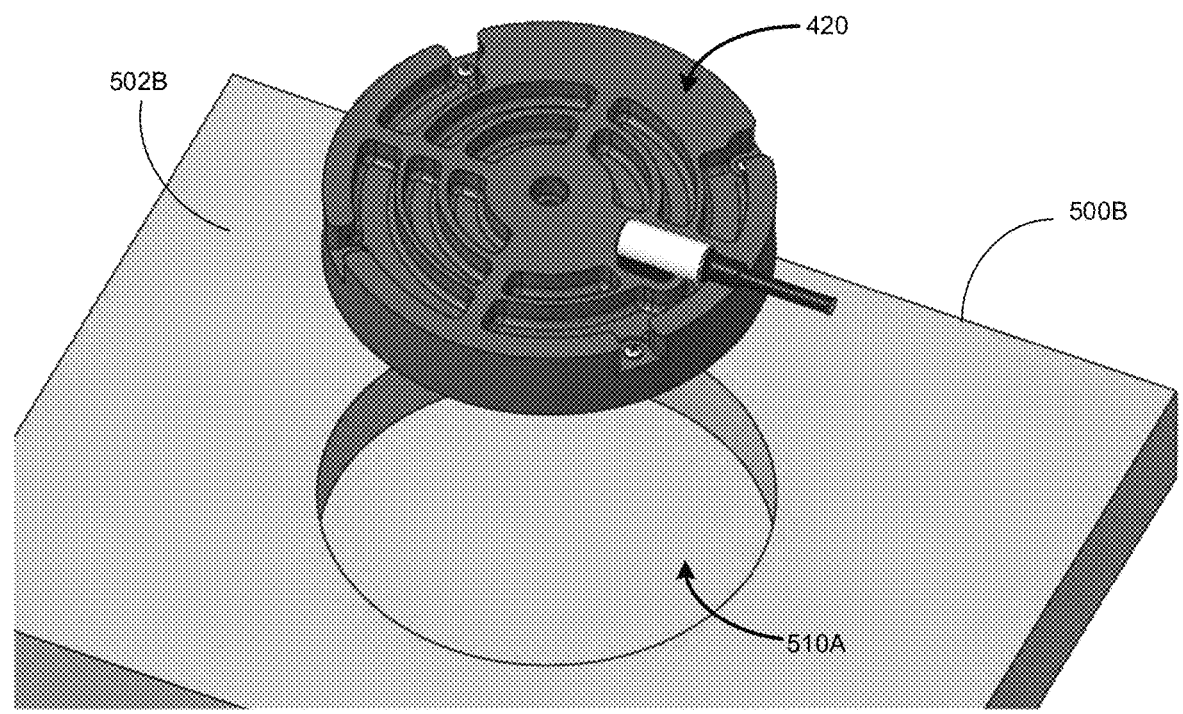
FIG. 13B is a bottom perspective view of the illustrated exemplary usage of the surface mountable power transmitter of FIG. 13A, in accordance with FIGS. 1-11, 13A and the present disclosure.

FIGS. 13A and 13B illustrate the power transmitter 400 mounted to a second structural surface 500B, the structural surface 500B including a hole 510A. The hole defines a hole ceiling 514A and a hole opening 512A. A hole depth 515A is defined as a distance between the hole ceiling 514A and the hole opening 512A. In some examples, the hole 510A is configured to receive the power transmitter 420, when being mounted on underside surface 502A proximate to the hole ceiling 514A. In some examples, the hole thickness 515A is less than the surface thickness 505B and the housing 400 is configured to mount to the hole ceiling 514A.

Figure 14:
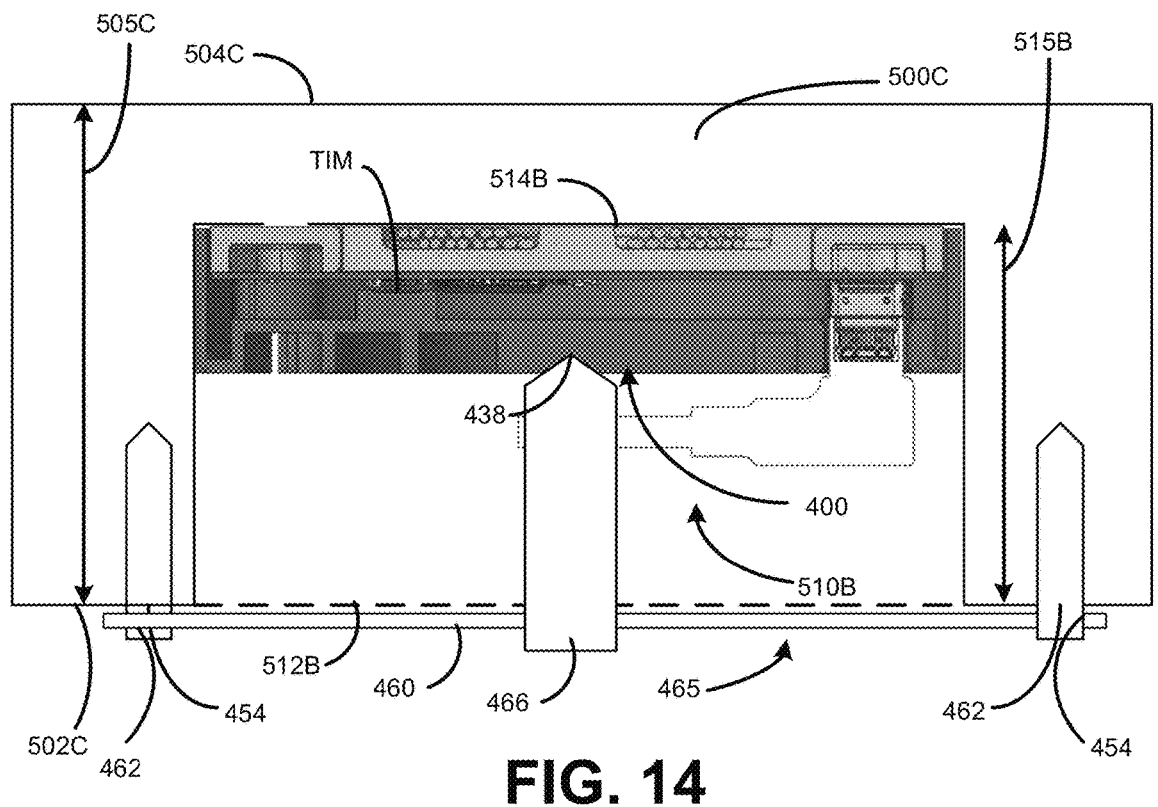
FIG. 14 is a cross sectional side view of the surface mountable power transmitter of FIG. 11, illustrating another exemplary usage of the surface mountable power transmitter of FIG. 11, with respect to a surface, in accordance with FIGS. 1-11 and the present disclosure.

In another example, FIG. 14 illustrates a third structural surface 500C, having a top side 504C and an underside 502C, defining a surface thickness 505C. The structural surface 500C defines a hole 510B, which has a hole ceiling 514B and a hole opening 512B. A thickness between the hole ceiling 514B and the hole opening 512B defines a hole thickness 515B. In comparison to the hole 510A of FIG. 13, the hole 510B has a significantly larger thickness 515B, such that the hole thickness 515B is greater than a thickness of the power transmitter 420. In some examples, the hole 510A is configured to receive the power transmitter 420, when being mounted on underside surface 502C proximate to the hole ceiling 514B. In some examples, the hole thickness 515B is less than the surface thickness 505B and the housing 400 is configured to mount to the hole ceiling 514B. In some examples, the surface thickness 505C is in a range of about 20 mm to about 60 mm and the hole thickness 515B is in a range of about 5 mm to about 50 mm.

As illustrated in FIG. 14, the housing 400 is operatively associated with an alternative connection system 465, configured for connecting the housing 400 to the underside of the surface 504C. The connection system 465 includes a bracket 460 for mounting to the underside of the surface 504, the bracket 460 defining one or more holes 462, within which fasteners 454 may be inserted to connect the bracket 460 and, by association, the housing 400 to the underside of the surface 504C. In some examples, the connection system 465 may include an external thermal connector 466, which connects to the bracket 460 to the heat sink 430 via, for example, a center hole 438 of the heat sink 430. The thermal connector 466 may be comprised, at least in part, of an electrically conductive material, similar to the heat sink 430, and be configured to further draw heat away and/or dissipate heat from the heat sink 430, the power transmitter 20, and/or the surface 504.

Figure 15:
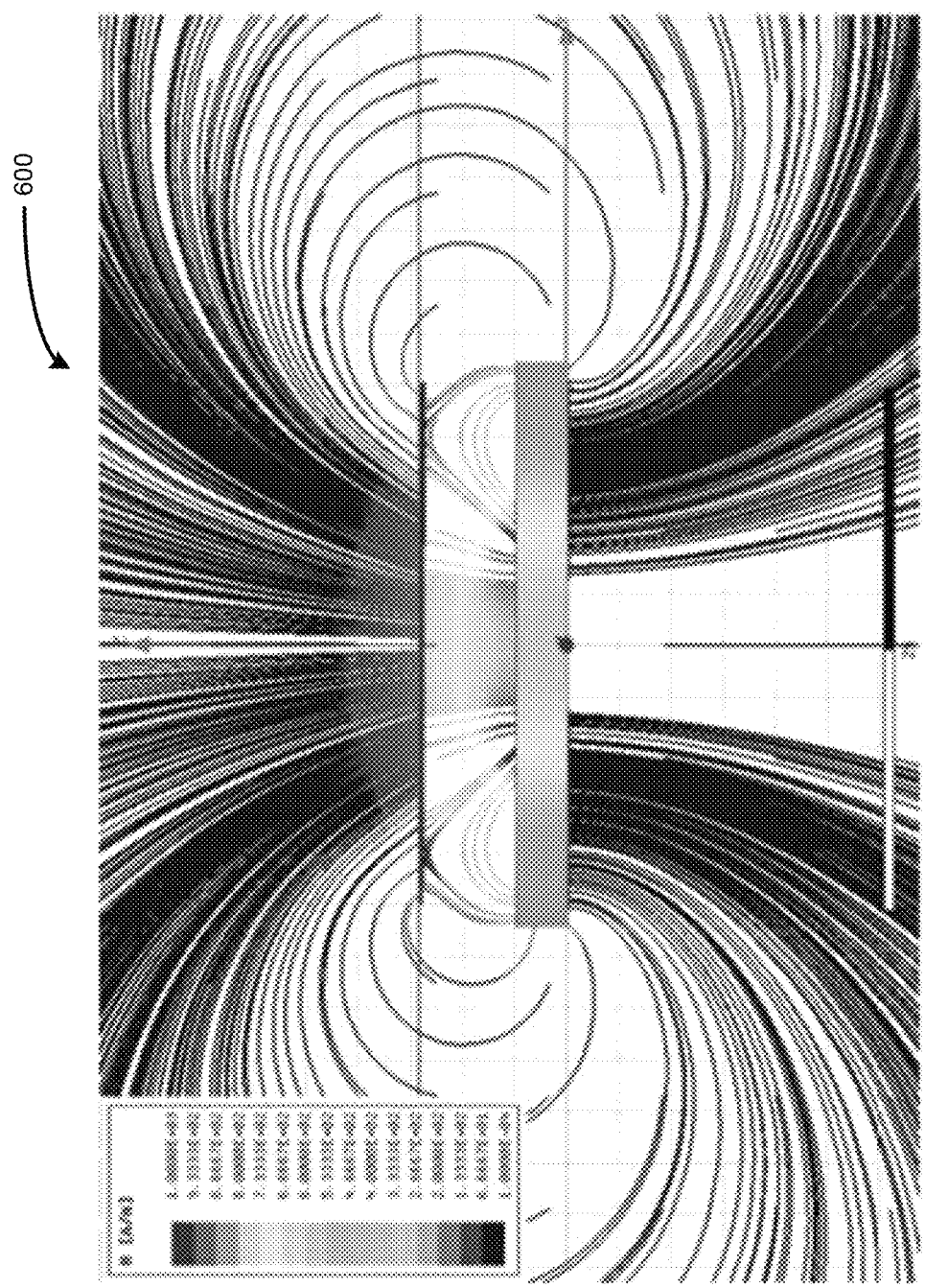
FIG. 15 is a readout of an actual simulation of magnetic fields generated by the coils and/or transmitters illustrated in FIGS. 1-14 and disclosed herein.

FIG. 15 is an exemplary, actual, simulation 600 of a magnetic field generated by a transmitter coil 21 and/or its associated power transmitter 20, 420 and captured by an exemplary receiver coil 31 and/or its associated power receiver 30, when the transmitter coil 21 and/or power transmitter 20, 420 are designed, manufactured, and/or implemented according to the teachings of this disclosure. The receiver coil 31 was as a standard Qi™ receiver coil utilized by commercial electronic devices, such as mobile phones, and the receiver coil 31 was modelled with a metal piece behind the coil, wherein the metal piece was used to simulate a battery. The simulation shows that the magnetic field generated by the transmitter coil 21 was captured by the receiver coil 31 at an extended Z-distance of 9 mm. As discussed previously, Qi™ wireless transmitter coils typically operate between coil-to-coil distances of about 3 mm to about 5 mm. The shaped-magnetics of the transmitter coil 21 have shown to favorably reshape a magnetic field so that coil-to-coil coupling can occur at extended Z-distances, wherein the Z-distances are extended about 2 times to about 5 times the distance of standard Qi™ wireless power transmitters. Furthermore, the shaped-magnetics of the present application can extend coupling of present day a Qi™ wireless power transmitter at a Z-distance ranging about 5 mm to about 25 mm. Any of the E-core and/or additional or alternative custom shapes for the shielding 80, may successfully be used to reshape the magnetic field for extended Z-distance coupling by a minimum of a 5% compared to standard present-day power transmitters. In addition, any of the E-core and custom shapes previously discussed, each in conjunction with its relation to a coil to the magnetic has also may further increase z-direction coupling by at least another 5%. An embodiment comprising a structure, the structure comprising a coil and a magnetic material, wherein a gap between the coil and the magnetic material residing at the inner diameter of the coil comprises 2 mm, reshapes the magnetic field so that coupling increases by 5%.

Further, as increasing the separation gap 17 may be associated with a rise in power levels, proper thermal mitigation via the systems and methods disclosed herein allows for higher separation gap wireless power transmitters. The systems and apparatus described herein allow for such thermal mitigation, so that the large separation gap is achieved without doing damage to one or more of the power transmitter, the device to be powered and/or power receiver associated with said device, the surface to which the power transmitter is mounted, or combinations thereof.

Additionally, the utilization of the power transmitters and/or transmitter antennas, disclosed herein, as part of a surface mountable power transmitter 420, allow for greater modularity in transmitter placement, relative to the surface upon which the power transmitter is mounted. Further, in some examples, the extended separation distance achieved by the power transmitters, disclosed herein, may allow for usage of surface mountable power transmitters on thicker surface thicknesses and/or thicker materials for the surfaces, when compared with legacy surface-associated power transmitters.

As is discussed above, the transmitter coils 21, power transmitters 20, 420, and/or base stations 11, disclosed herein, may achieve great advancements in Z-distance and/or gap 17 height, when compared to legacy, low-frequency (e.g., in a range of about 87 kHz to about 205 kHz) transmission coils, power transmitters, and/or base stations. To that end, an extended Z-distance not only expands a linear distance, within which a receiver may be placed and properly coupled with a transmitter, but an extended Z-distance expands a three-dimensional charging and/or operational volume ("charge volume"), within which a receiver may receive wireless power signals from a transmitter. For the following example, the discussion fixes lateral spatial freedom (X and Y distances) for the receiver coil, positioned relative to the transmitter coil, as a control variable. Accordingly, for discussion purposes only, one assumes that the X and Y distances for the base stations 11, power transmitters 20, and/or transmitter coils 21 are substantially similar to the X and Y distances for the legacy system(s). However, it is certainly contemplated that the inventions disclosed herein may increase one or both of the X-distance and Y-distance. Furthermore, while the instant example uses the exemplary range of 8-10 mm for the Z-distance of the base stations 11, power transmitters 20, and/or transmitter coils 21, it is certainly contemplated and experimental results have shown that the base stations 11, power transmitters 20, and/or transmitter coils 21 are certainly capable of achieving Z-distances having a greater length than about 10 mm, such as, but not limited to, up to 15 mm and/or up to 30 mm. Accordingly, the following table is merely exemplary and for illustration that the expanded Z-distances, achieved by the base stations 11, power transmitters 20, and/or transmitter coils 21, have noticeable, useful, and beneficial impact on a charge volume associated with one or more of the base stations 11, power transmitters 20, and/or transmitter coils 21.

| Spatial Freedom Comparison | | | | | |
| --- | --- | --- | --- | --- | --- |
| | X-dist | Y-dist | Z-dist (min) | Z-dist (max) | Charge Vol. (min) | Charge Vol. (max) |
| Legacy | 5 mm | 5 mm | 3 mm | 5 mm | 75 mm³ | 125 mm³ |
| 11, 20, 21 (8-10 mm. ver.) | 5 mm | 5 mm | 8 mm | 10 mm | 200 mm³ | 250 mm³ |
| 11, 20, 21 (15 mm. ver.) | 5 mm | 5 mm | 10 mm | 15 mm | 250 mm³ | 375 mm³ |
| 11, 20, 21 (30 mm. ver.) | 5 mm | 5 mm | 15 mm | 30 mm | 375 mm³ | 750 mm³ |

Thus, by utilizing the base stations 11, power transmitters 20, and/or transmitter coils 21, the effective charge volume may increase by more than 100 percent, when compared to legacy, low-frequency wireless power transmitters. Accordingly, the base stations 11, power transmitters 20, and/or transmitter coils 21 may achieve large Z-distances, gap heights, and/or charge volumes that were not possible with legacy low frequency, but thought only possible in lower power, high frequency (e.g., above about 2 Mhz) wireless power transfer systems.

FIG. 16 is an example block diagram for a method 1200 for designing the power transmitter 420. The method includes designing the surface mount housing 400, as illustrated in block 1205. The method 1200 includes designing and/or selecting the transmitter coil 21 for the power transmitter 420, as illustrated in block 1210. The method 1200 includes tuning the power transmitter 420, as illustrated in block 1220. Such tuning may be utilized for, but not limited to being utilized for, impedance matching.

The method 1200 further includes designing the power conditioning system 40 for the power transmitter 240, as illustrated in block 1230. The power conditioning system 40 may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. Further, at block 1240, the method 1200 may determine and optimize a connection, and any associated connection components, to configure and/or optimize a connection between the input power source 12 and the power conditioning system 40 of block 1230. Such determining, configuring, and/or optimizing may include selecting and implementing protection mechanisms and/or apparatus, selecting and/or implementing voltage protection mechanisms, among other things.

The method 1200 further includes designing and/or programing the control and communications system 26 of the power transmitter 420, as illustrated in block 1250. Components of such designs include, but are not limited to including, the sensing system 50, the driver 41, the transmission controller 28, the memory 27, the communications system 29, the thermal sensing system 52, the object sensing system 54, the receiver sensing system 56, the electrical sensor(s) 57, the other sensor(s) 58, in whole or in part and, optionally, including any components thereof.

FIG. 17 is an example block diagram for a method 2200 for manufacturing the power transmitter 420. The method forming and/or manufacturing the surface mount housing 400, as illustrated in block 1205. The method 2200 includes manufacturing and/or selecting the transmitter coil 21 for the power transmitter 420, as illustrated in block 2210. The method 2200 includes tuning the power transmitter 420, as illustrated in block 2220. Such tuning may be utilized for, but not limited to being utilized for, impedance matching.

The method 2200 further includes manufacturing the power conditioning system 40 for the power transmitter 420, as illustrated in block 2230. The power conditioning system 40 may be designed and/or manufactured with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. Further, at block 2240, the method 2200 may include connecting and/or optimizing a connection, and any associated connection components, to configure and/or optimize a connection between the input power source 12 and the power conditioning system 40 of block 2230. Such determining, manufacturing, configuring, and/or optimizing may include selecting and implementing protection mechanisms and/or apparatus, selecting and/or implementing voltage protection mechanisms, among other things.

The method 2200 further includes designing and/or programing the control and communications system 26 of the power transmitter 420, as illustrated in block 2250. Components of such designs include, but are not limited to including, the sensing system 50, the driver 41, the transmission controller 28, the memory 27, the communications system 29, the thermal sensing system 52, the object sensing system 54, the receiver sensing system 56, the electrical sensor(s) 57, the other sensor(s) 58, in whole or in part and, optionally, including any components thereof.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination.

What is claimed is:

1. A power transmitter for wireless power transfer at an operating frequency selected from a range of about 87 kilohertz (kHz) to about 205 kHz, the power transmitter comprising:
   a control and communications unit;
   an inverter circuit configured to receive input power and convert the input power to a power signal;
   a transmitter antenna, the transmitter antenna including:
      a coil structure configured to transmit the power signal to a device having a power receiver, the coil structure comprising at least one layer of Litz wire, wherein the coil structure has a top surface, a bottom surface, and a side surface; and
      a ferrite shielding structure comprising a magnetic core having an outer face, a magnetic backing having a top face, and a magnetic ring having an inner face, and the ferrite shielding structure having a cavity defined by the outer face of the magnetic core, the top face of the magnetic backing, and the inner face of the magnetic ring, the cavity configured such that the ferrite shielding structure substantially surrounds at least a portion of the bottom surface of the coil structure and at least a portion of the side surface of the coil structure, and wherein the bottom surface of the coil structure and the top face of the magnetic backing are separated by a separation distance; and
   a surface mountable housing, the surface mountable housing connected to, at least, the transmitter antenna, and the surface mountable housing including a connector system configured for use to mount, at least, the transmitter antenna to an underside of a structural surface such that the transmitter antenna is configured to couple with a receiver antenna of the power receiver when the receiver antenna is proximate to a top side of the structural surface,
   wherein, when the transmitter antenna is mounted to the underside of the structural surface, the top surface of the coil structure has a first height and the top side of the structural surface has a second height, wherein the second height is greater than the first height by a gap distance in a range of about 8 millimeters (mm) to about 15 mm.

2. The power transmitter of claim 1, wherein at least part of the surface mountable housing further includes a heat sink, the heat sink configured to rest, at least in part, below the transmitter antenna, when the power transmitter is mounted to the structural surface, and configured to direct heat generated by the power transmitter away from the structural surface.

3. The power transmitter of claim 2, further comprising a transmitter electronics circuit board, the transmitter electronics circuit board including components of one or more of the control and communications circuit, the inverter circuit, or a combination thereof, and
   wherein the heat sink is further configured to dissipate heat, generated by one or more of the transmitter electronics circuit board or components located on the transmitter electronics circuit board, away from the structural surface.

4. The power transmitter of claim 3, further comprising a thermal interface material, the thermal interface material disposed between the transmitter electronics circuit board and the heat sink and configured to direct heat from the transmitter electronics circuit board to the heat sink.

5. The power transmitter of claim 4, wherein the thermal interface material includes one or more of a thermal paste, a thermal adhesive, a thermal gap filter, a thermally conductive pad, a thermal tape, a phase-change material, a metal thermal interface, or combinations thereof.

6. The power transmitter of claim 2, wherein the surface mountable housing further includes an antenna housing, the antenna housing substantially surrounding a side wall of the transmitter antenna, and
   wherein the antenna housing is connected to the heat sink and positioned between the heat sink and the structural surface.

7. The power transmitter of claim 2, wherein the heat sink defines one or more cut outs, each of the one or more cut outs configured to increase external surface area of the heat sink.

8. The power transmitter of claim 2, wherein the heat sink is formed, at least in part, from aluminum.

9. The power transmitter of claim 1,
   wherein the transmitter antenna is capable of transmitting the power signal to the power receiver via magnetic coupling with a receiver coil when the power receiver is positioned proximate to the top side of the structural surface and the receiver coil is separated from the coil structure of the transmitter antenna by the gap distance.

10. The power transmitter of claim 1, wherein a surface thickness is defined as a thickness between the underside of the structural surface and the top side of the structural surface, and
    wherein the structural surface includes a hole, the hole defining a hole ceiling and a hole opening,
    wherein a hole thickness is defined as a thickness between the hole ceiling and the hole opening,
    wherein the hole thickness is less than the surface thickness, and
    wherein the surface mountable housing is configured to mount to the hole ceiling of the hole of the structural surface.

11. The power transmitter of claim 10, wherein the surface thickness is in a range of about 20 mm to about 60 mm, and
    wherein the hole thickness is in a range of about 5 mm to about 50 mm.

12. The power transmitter of claim 1, wherein the separation distance increases the magnetic coupling between the coil structure of the transmitter antenna and a receiver coil of the power receiver at an extended z-distance.

13. The power transmitter of claim 1, wherein the separation distance is in a range of about 0.1 millimeters (mm) to about 0.5 mm.

14. A power transmitter for wireless power transfer at an operating frequency selected from a range of about 87 kilohertz (kHz) to about 205 kHz, the power transmitter comprising:
    a control and communications unit;
    an inverter circuit configured to receive input power and convert the input power to a power signal;

a transmitter antenna, the transmitter antenna including:
  a coil structure configured to transmit the power signal to a device having a power receiver, the coil structure comprising at least one layer of Litz wire, wherein the coil structure has a top surface, a bottom surface, and a side surface; and
  a ferrite shielding structure comprising a magnetic core having an outer face, a magnetic backing having a top face, and a magnetic ring having an inner face, and the ferrite shielding structure having a cavity defined by the outer face of the magnetic core, the top face of the magnetic backing, and the inner face of the magnetic ring, the cavity configured such that the ferrite shielding structure substantially surrounds at least a portion of the bottom surface of the coil structure and at least a portion of the side surface of the coil structure, and wherein the bottom surface of the coil structure and the top face of the magnetic backing are separated by a separation distance; and
a surface mountable housing, the surface mountable housing connected to, at least, the transmitter antenna, and the surface mountable housing including a connector system configured for use to mount, at least, the transmitter antenna to an underside of a structural surface such that the transmitter antenna is configured to couple with a receiver antenna of the power receiver when the receiver antenna is proximate to a top side of the structural surface,
wherein, when the transmitter antenna is mounted to the underside of the structural surface, the top surface of the coil structure has a first height and the top side of the structural surface has a second height, wherein the second height is greater than the first height by a gap distance in a range of about 8 millimeters (mm) to about 15 mm.

15. The surface mountable power transmitter of claim 14, wherein the ferrite shielding structure is an E-Core type shielding structure and the cavity is configured in an E-shape configuration.

16. The surface mountable power transmitter of claim 14, wherein the at least one layer of Litz wire comprises a first layer and a second layer, and wherein the first layer includes a first number of turns in a range of about 4 turns to about 5 turns, and wherein the second layer includes a second number of turns in a range of about 4 turns to about 5 turns.

17. The surface mountable power transmitter of claim 16, wherein the first layer and the second layer comprise bifilar Litz wire.

18. The surface mountable power transmitter of claim 14, wherein the separation distance increases the magnetic coupling between the coil structure of the transmitter antenna and a receiver coil of the power receiver at an extended z-distance.

19. The surface mountable power transmitter of claim 14, wherein the separation distance is in a range of about 0.1 millimeters (mm) to about 0.5 mm.

20. A surface mountable housing for a power transmitter for wireless power transfer at an operating frequency selected from a range of about 87 kilohertz (kHz) to about 205 kHz, the power transmitter including, at least, a transmitter antenna comprising a coil having a side surface and a bottom surface substantially surrounded by a ferrite core, the surface mountable housing comprising:
  a connector system configured for use to mount, at least, the transmitter antenna to an underside of a structural surface, such that the transmitter antenna is configured to couple with a receiver antenna of a power receiver when the receiver antenna is proximate to a top side of the structural surface;
  a heat sink comprising an outer side wall and a bottom wall defining a recess, the heat sink configured to rest, at least in part, below the transmitter antenna, when the power transmitter is mounted to the structural surface, and configured to direct heat generated by the power transmitter away from the structural surface; and
  an antenna housing comprising an outer face, a top face, an inner face, and a bottom face, the antenna housing positioned within the recess of the heat sink such that the outer side wall of the heat sink substantially surrounds the outer face of the antenna housing, wherein the inner face of the antenna housing substantially surrounds a side wall of the ferrite core of the transmitter antenna, the antenna housing connected to the heat sink and positioned between the heat sink and the structural surface,
  wherein, when the transmitter antenna is mounted to the underside of the structural surface, a top surface of the transmitter antenna has a first height and the top side of the structural surface has a second height, wherein the second height is greater than the first height by a gap distance in a range of 8 millimeters (mm) to 15 mm; and
  a transmitter electronic circuit board that is positioned within the recess of the heat sink below the bottom face of the antenna housing and below a bottom wall of the ferrite core of the transmitter antenna and above the bottom wall of the heat sink,
  wherein the connector system connects the heat sink to the antenna housing through at least a portion of the transmitter electronic circuit board when the surface mountable housing is mounted to the underside of the structural surface.

* * * * *